(12) United States Patent
Jang et al.

(10) Patent No.: US 11,910,920 B2
(45) Date of Patent: Feb. 27, 2024

(54) CLOTHING TREATMENT APPARATUS AND ONLINE SYSTEM

(71) Applicant: LG Electronics Inc., Seoul (KR)

(72) Inventors: Guang Jang, Seoul (KR); Mina Suh, Seoul (KR); Sungmin You, Seoul (KR); Sukhyun Lim, Seoul (KR); Juhee Jo, Seoul (KR)

(73) Assignee: LG Electronics Inc., Seoul (KR)

( * ) Notice: Subject to any disclaimer, the term of this patent is extended or adjusted under 35 U.S.C. 154(b) by 392 days.

(21) Appl. No.: 17/276,049

(22) PCT Filed: Sep. 11, 2019

(86) PCT No.: PCT/KR2019/011821
§ 371 (c)(1),
(2) Date: Mar. 12, 2021

(87) PCT Pub. No.: WO2020/055158
PCT Pub. Date: Mar. 19, 2020

(65) Prior Publication Data
US 2022/0042231 A1    Feb. 10, 2022

(30) Foreign Application Priority Data

Sep. 12, 2018 (KR) .......................... 10-2018-0108969
Sep. 11, 2019 (KR) .......................... 10-2019-0112637

(51) Int. Cl.
*A47B 67/00*     (2006.01)
*D06F 58/44*     (2020.01)
(Continued)

(52) U.S. Cl.
CPC ............ *A47B 67/005* (2013.01); *D06F 34/04* (2020.02); *D06F 34/18* (2020.02); *D06F 34/28* (2020.02);
(Continued)

(58) Field of Classification Search
CPC .................................................. A47B 67/005
See application file for complete search history.

(56) References Cited

U.S. PATENT DOCUMENTS 8,068,676 B2    11/2011   Zhang et al.
2005/0016012 A1   1/2005   Yang et al.
(Continued)

FOREIGN PATENT DOCUMENTS

CN    101328659    12/2008
CN    102443998     5/2012
(Continued)

OTHER PUBLICATIONS

Office Action in Russian Appln. No. 2021107896, dated Sep. 22, 2021, 8 pages (English translation).
(Continued)

*Primary Examiner* — Jason Y Ko
(74) *Attorney, Agent, or Firm* — Fish & Richardson P.C.

(57) ABSTRACT

The present invention relates to an online system and a control method therefor, the online system comprising a clothing apparatus which may determine a cycle or an option by calculating the contamination level and wrinkling of clothes, or intensively treat parts that are contaminated or wrinkled, or recommend laundering with a washing machine when the contamination level or wrinkling is equal to or greater than a reference value, or induce a server or a washing machine to determine an appropriate cycle or option for laundering the clothes.

23 Claims, 13 Drawing Sheets

(51) Int. Cl.

| | | |
|---|---|---|
| *D06F 34/04* | (2020.01) | |
| *D06F 34/28* | (2020.01) | |
| *G06V 10/56* | (2022.01) | |
| *G06V 40/10* | (2022.01) | |
| *G06V 10/44* | (2022.01) | |
| *G06V 10/26* | (2022.01) | |
| *G06V 10/22* | (2022.01) | |
| *G06V 40/20* | (2022.01) | |
| *D06F 58/00* | (2020.01) | |
| *D06F 58/20* | (2006.01) | |
| *G06F 3/02* | (2006.01) | |
| *G06F 3/04842* | (2022.01) | |
| *G06F 3/16* | (2006.01) | |
| *G06Q 30/0601* | (2023.01) | |
| *D06F 34/18* | (2020.01) | |
| *D06F 58/26* | (2006.01) | |
| *G06T 11/60* | (2006.01) | |
| *H04N 23/60* | (2023.01) | |
| *D06F 101/02* | (2020.01) | |
| *D06F 105/58* | (2020.01) | |
| *D06F 103/02* | (2020.01) | |
| *D06F 103/28* | (2020.01) | |
| *D06F 105/32* | (2020.01) | |
| *D06F 105/40* | (2020.01) | |
| *H04N 7/18* | (2006.01) | |

(52) U.S. Cl.
CPC ............ *D06F 58/00* (2013.01); *D06F 58/203* (2013.01); *D06F 58/263* (2013.01); *D06F 58/44* (2020.02); *G06F 3/02* (2013.01); *G06F 3/04842* (2013.01); *G06F 3/167* (2013.01); *G06Q 30/0625* (2013.01); *G06Q 30/0631* (2013.01); *G06T 11/60* (2013.01); *G06V 10/22* (2022.01); *G06V 10/26* (2022.01); *G06V 10/44* (2022.01); *G06V 10/56* (2022.01); *G06V 40/103* (2022.01); *G06V 40/20* (2022.01); *H04N 23/60* (2023.01); *D06F 2101/02* (2020.02); *D06F 2103/02* (2020.02); *D06F 2103/28* (2020.02); *D06F 2105/32* (2020.02); *D06F 2105/40* (2020.02); *D06F 2105/58* (2020.02); *G06T 2210/16* (2013.01); *H04N 7/18* (2013.01)

(56) References Cited

U.S. PATENT DOCUMENTS

| | | |
|---|---|---|
| 2010/0236296 A1 | 9/2010 | Choi et al. |
| 2012/0317729 A1 | 12/2012 | Song et al. |
| 2013/0083999 A1 | 4/2013 | Bhardwaj et al. |
| 2016/0042565 A1 | 2/2016 | Osada et al. |
| 2017/0090450 A1 | 3/2017 | Taite et al. |
| 2017/0350067 A1 | 12/2017 | Choi |
| 2018/0002860 A1 | 1/2018 | Song et al. |
| 2018/0173807 A1 | 6/2018 | Prakash et al. |

FOREIGN PATENT DOCUMENTS

| | | |
|---|---|---|
| CN | 103597519 | 2/2014 |
| CN | 105046280 | 11/2015 |
| CN | 105374058 | 3/2016 |
| CN | 105447800 | 3/2016 |
| CN | 108166209 | 6/2018 |
| CN | 108256975 | 7/2018 |
| EP | 1939349 | 4/2017 |
| EP | 3269864 | 1/2018 |
| JP | H01050939 | 2/1989 |
| JP | 2003225491 | 8/2003 |
| JP | 2006331131 | 12/2006 |
| JP | 2012143617 | 8/2012 |
| JP | 2013103136 | 5/2013 |
| JP | 2014102739 | 6/2014 |
| JP | 2016038813 | 3/2016 |
| JP | 2017004464 | 1/2017 |
| JP | 2017054283 | 3/2017 |
| JP | 2017095963 | 6/2017 |
| KR | 1020090017826 | 2/2009 |
| KR | 20110099916 | 9/2011 |
| KR | 20120074557 | 7/2012 |
| KR | 1020130013237 | 2/2013 |
| KR | 1020130109721 | 10/2013 |
| KR | 1020160039872 | 4/2016 |
| KR | 101736804 | 5/2017 |
| KR | 1020170060736 | 6/2017 |
| KR | 1020170084454 | 7/2017 |
| KR | 1020170125855 | 11/2017 |
| KR | 1020170137505 | 12/2017 |
| KR | 1020180051817 | 5/2018 |
| RU | 2604312 | 12/2016 |
| RU | 2637981 | 12/2017 |
| TW | M454597 | 6/2013 |
| WO | WO2016070309 | 5/2016 |
| WO | WO2018076923 | 5/2018 |
| WO | WO2018212585 | 11/2018 |

OTHER PUBLICATIONS

Office Action in Russian Appln. No. 2021109651, dated Aug. 26, 2021, 8 pages (English translation).
PCT International Search Report and Written Opinion in International Appln. No. PCT/KR2019/011816, dated Jan. 10, 2021, 8 pages (with English translation).
Extended European Search Report in European Appln. No. 19859110.9, dated May 10, 2022, 9 pages.
Office Action in Australian Appln. No. 2019337284, dated Mar. 31, 2022, 7 pages.
Office Action in Australian Appln. No. 2019338892, dated Mar. 31, 2022, 10 pages.
PCT International Search Report and Written Opinion in International Appln. No. PCT/KR2019/011821, dated Jan. 20, 2020, 7 pages (with English translation).
Office Action in Chinese Appln. No. 201980059807.3, dated Jul. 27, 2022, 32 pages (with English translation).
Office Action in Chinese Appln. No. 201980059808.8, dated Aug. 3, 2022, 32 pages (with English translation).
Office Action in Japanese Appln. No. 2021-513186, dated May 31, 2022, 11 pages (with English translation).
Office Action in Japanese Appln. No. 2021-537426, dated May 10, 2022, 8 pages (with English translation).
Extended European Search Report in European Appln. No. 19859109.1, dated Oct. 21, 2022, 10 pages.
Office Action in Japanese Appln. No. 2021-537426, dated Dec. 20, 2022, 5 pages (with English translation).

CLOTHING TREATMENT APPARATUS AND ONLINE SYSTEM

CROSS-REFERENCE TO RELATED APPLICATIONS

This application is a National Stage application under 35 U.S.C. § 371 of International Application No. PCT/KR2019/011821, filed on Sep. 11, 2019, which claims the benefit of Korean Application No. 10-2019-0112637, filed on Sep. 11, 2019, and Korean Application No. 10-2018-0108969, filed on Sep. 12, 2018. The disclosures of the prior applications are incorporated by reference in their entirety.

TECHNICAL FIELD

The present disclosure relates to a clothing treating apparatus capable of detecting or calculating a contamination level and a wrinkling level of clothes and an on-line system including the same.

BACKGROUND ART

A clothing treating apparatus includes a clothing treating apparatus for refreshing clothing, a washing machine for washing clothing, and a dryer for drying clothing. A representative example of the clothing treating apparatus has a brand name "Trom Styler".

In recent years, there is an increasing tendency that a plurality of home appliances such as a washing machine for washing clothing and a clothing treating apparatus capable of refreshing clothing are disposed indoors. The user may use the clothing treating apparatus when it is determined that the clothing needs to be refreshed based on a state of the clothing, or may use the washing machine when it is determined that washing of the clothing is necessary.

When using the clothing treating apparatus, it is common for the user to directly determine a material or a contamination level of the clothes and select an appropriate course or option among courses or options provided by the clothing treating apparatus. For example, when the clothing material is vulnerable to a temperature or friction, the user selects a course and option suitable for a relatively low temperature and a low driving force among courses and options provided by the clothing treating apparatus.

However, when the user does not accurately recognize characteristics of the clothing material or does not know characteristics of the course and option provided by the clothing treating apparatus, the user may not utilize a course or option suitable for the clothing material even though the clothing treating apparatus provides the course or option suitable for the clothing material.

Further, the user may not accurately recognize the contamination level of clothes, or does not recognize the course or option corresponding to the contamination level. In this case, although the clothing treating apparatus provides an optimal course or option to prevent damage to clothing while eliminating contamination from the clothes, users may not utilize the optimal course or option.

To solve this problem, Korean Patent Application Publication No. 10-2018-0015927 disclosed a washing machine that recognizes the material of clothes and determines a course suitable for the material. However, the washing machine does not directly detect the material of the clothing. However, the user should directly insert an identification object providing clothing material information into the washing machine. In other words, when the user does not input the identification object, or the user misunderstands an actual material of the clothing and inserts an incorrect identification object, the appropriate course or option is not recommended. Further, the washing machine may not recommend a course or option suitable for the contamination level or the wrinkling level of clothes.

To compensate for this problem, Korean Patent Application Publication No. 10-2016-0039872 disclosed a washing machine that may identify a fiber type of clothes using an optical sensor and a contamination level of the clothes using a turbidity sensor. When the clothing is put into the washing machine, the machine may identify the type of clothes and directly determine a corresponding course and option and recommend the same, and directly grasp the contamination level of a rinsing water, and increase or decrease the number of washing or rinsing based on the level. Thus, even when the user does not accurately recognize the material or the contamination level of clothes, or does not know the corresponding course or option, the user may execute the optimal course or option recommended by the clothing treating apparatus.

However, this washing machine may not acquire additional information other than the material of clothes using an optical sensor. For example, the machine may not be able to determine the contamination level or the wrinkling level of clothes using the optical sensor, and may be unable to identify some regions with a high contamination level or a high wrinkling level on the clothing.

Further, this washing machine may not graph the contamination level of the clothes when the clothing is not immersed in the rinsing water. In other words, this washing machine causes inconvenience in that at least a water supply cycle and a water drainage cycle must be executed to determine the contamination level of clothes.

Furthermore, this washing machine may perform intensive washing of an entirety of the clothing even when only a portion of the clothing has a high contamination level or a high wrinkling level, thereby reducing a lifespan of the clothing.

The contamination level of clothes may depend on an external environment. For example, when it rains, or when a high temperature or high humidity is present, the contamination level of clothes may be high. Referring to Korean Patent Application Publication No. 10-2016-0088112, an external terminal device and a washing machine are connected to each other, and the washing machine receives weather, humidity, and dust concentration from the external terminal device and automatically determines an appropriate washing course.

However, such a washing machine only infers a course or option suitable for the external environment, but may not directly detect the contamination level or material of the clothing, and thus may not provide a course or option corresponding thereto.

The clothing treating apparatus removes wrinkling, odor, dust and foreign substances from the clothing by evenly supplying hot-air or steam to an interior space. However, when a plurality of clothes are accommodated in the inner space, specific clothing may have a higher wrinkling level or the contamination level than that of other clothing. In the conventional clothing treating apparatus, even when a plurality of clothes having different contamination levels or the wrinkling levels are accommodated in the internal space, uniform hot-air or steam is supplied thereto, so that sufficient hot-air or steam may not be supplied to specific clothing. Further, there is a problem in that excessive hot-air or steam is supplied to other clothing to eliminate contamination or wrinkling from the specific clothing.

In recent years, as the standard of living is improved and the user's convenience is maximized, a plurality of clothes treating apparatuses may be disposed in the home. For example, referring to Korean Patent Application Publication No. 10-2019-0016363, both a washing machine and a dryer may be disposed in the home. Thus, the user may use the washing machine to remove foreign substances from the clothing and the dryer to remove moisture from the clothing. Furthermore, the washing machine may automatically recommend a washing course or option according to weather information, and the dryer may automatically recommend a drying course and option according to weather information. Therefore, even when there is the plurality of clothes treating apparatuses, thus could use them without difficulty although the user could not understand the course or option of each of the clothing treating apparatuses. However, this advantage is derived only when the roles of the plurality of clothes treating apparatuses are completely distinguished from each other, which is the case between the washing machine and the dryer.

Specifically, when the plurality of clothes treating apparatuses disposed in the home include a clothing treating apparatus and a washing machine, the user may not be able to accurately determine which home appliance treats a clothing worn on the user. This is because both of the clothing treating apparatus and washing machine clothing remove foreign substances from clothing although the clothing treating apparatus and washing machine clothing remove the foreign substances in different removing schemes and different amounts.

Therefore, although the clothing may be sufficiently treated only using a refresh cycle, the user may use the washing machine to reduce the durability and lifespan of the clothing. Further, even though the clothing needs a washing cycle, the user may refresh the clothing only using the clothing treating apparatus and thus may not remove the contamination from the clothing in a reliable manner.

Further, the user puts the clothing into the clothing treating apparatus or the washing machine in an incorrect manner. However, there is no system to notify the user of this incorrect input, so that the user's fault is not removed.

Further, even when the user recognizes that the clothing is incorrectly inserted into the clothing treating apparatus that performs refreshing, the user should insert the clothing into the washing machine that performs washing and re-enter a washing course or option. This is inconvenient.

As a result, in the prior art, even though the plurality of home appliances such as the clothing treating apparatus and the washing machine communicate with each other or are managed via a specific server, there is a limitation in that they may not operate in association with each other.

DISCLOSURE

Technical Purpose

A purpose of the present disclosure is to provide a clothing treating apparatus capable of washing or refreshing clothing and detecting a state, a contamination level, or a wrinkling level of the clothes, and an on-line system including the same.

A purpose of the present disclosure is to provide a clothing treating apparatus capable of determining and recommending an appropriate course or option according to a detected contamination level or the wrinkling level, and an on-line system including the same.

A purpose of the present disclosure is to provide a clothing treating apparatus capable of detecting a region having a high wrinkling level or a high contamination level on a specific clothing, or a region having a high contamination level or a high wrinkling level inside the clothing treating apparatus, and an on-line system including the same.

A purpose of the present disclosure is to provide a clothing treating apparatus capable of intensively washing or refreshing a region having a high wrinkling level or a high contamination level on a specific clothing, or a region having a high contamination level or a high wrinkling level inside the clothing treating apparatus, and an on-line system including the same.

A purpose of the present disclosure is to provide a clothing treating apparatus capable of grasping a state or a contamination level of clothes, and recommending an appropriate home appliance based on the state or the contamination level of clothes, and an on-line system including the same.

A purpose of the present disclosure is to provide an on-line system in which one home appliance automatically determines a course or an option based on information received from another home appliance.

A purpose of the present disclosure is to provide an on-line system in which a washing machine receives a contamination level or a wrinkling level of clothes detected by a clothing treating apparatus from a server or directly from the clothing treating apparatus, and determines and recommends a suitable washing course or option based on the contamination level or the wrinkling level.

Technical Solution

An on-line system according to the present disclosure may include a plurality of home appliances including a clothing treating apparatus for refreshing clothing and a washing machine for washing the clothing, and a server capable of remotely controlling the plurality of home appliances.

The clothing treating apparatus provides a refresh course or a refresh option in which hot-air or steam is supplied to the clothing, and the washing machine provides a washing course or a washing option in which foreign substances are removed from the clothing using water and detergent.

The clothing treating apparatus may refresh the clothing while the clothing is not contact with water or detergent, thereby preventing damage to the clothing as much as possible. The clothing treating apparatus may supply at least one of hot-air or steam to the clothing to remove odor or moisture from the clothing or to remove foreign substances such as dust from the clothing, and to remove wrinkling from the clothes.

Unlike the washing machine or the dryer, the clothing treating apparatus does not use water and detergent. Thus, the user is not familiar with a manipulation manner of the clothing treating apparatus. Accordingly, the clothing treating apparatus may include a sensor capable of detecting a state of the clothing, and a controller capable of identifying a state of the clothing based on information received from the sensor.

The sensor may be configured to detect foreign substances separated from the clothing treating apparatus using an electrical or chemical sensor and indirectly determine the contamination level of the clothes, based on the detected foreign substances or to direct image the clothing and intuitively grasp the contamination level or the wrinkling level state of the clothing based on the image.

The controller of the clothing treating apparatus may automatically determine the contamination level or the wrinkling level of the clothes and determine a corresponding refresh course or refresh option thereto. The refresh course or refresh option corresponding to the contamination level or the wrinkling level of the clothes may be stored in the clothing treating apparatus or the server in a form of a table. The table may be received via a communication module of the clothing treating apparatus, or a result value of the table may be received via the communication module.

In one example, the clothing treating apparatus includes a supply that may intensively supply hot-air or steam to the clothing having a high contamination level or a high wrinkling level, or a portion of the clothing having a high contamination level or a high wrinkling level.

A clothing receiving space of the clothing treating apparatus in which clothing is accommodated may be divided into n sub-spaces. The supply may supply the steam or hot-air to a specific sub-space.

Furthermore, the supply may further include a plurality of guide ducts for supplying steam or hot-air to the sub-spaces of the clothing receiving space of the clothing treating apparatus, respectively.

Further, the clothing treating apparatus may have a plurality of guide holes through which hot-air or steam is supplied and which be arranged along a longitudinal direction and a width direction of the space accommodating the clothing. The guide duct may communicate the guide holes and the supply. Accordingly, a plurality of valves whose opening degrees are controlled may be disposed at the guide duct or the plurality of guide holes. The controller controls the valves so that hot-air or steam may be intensively supplied to a specific portion.

When an output level of the supply is constant, and hot-air or steam is supplied to the specific portion, a pressure and flow rate of hot-air or steam increase significantly. Therefore, the portion having a high contamination level or a high wrinkling level may be intensively refreshed.

The clothing treating apparatus does not use water and detergent and thus may not achieve the sufficient refreshing effect of clothes when the contamination level or the wrinkling level of the clothes is high. In this case, when the user operates the clothing treating apparatus unnecessarily, this causes waste of energy and time. Therefore, the on-line system according to the present disclosure may recommend washing the clothing using the washing machine when the contamination level or the wrinkling level of the clothes is higher than a reference value.

The reference value may be within a range of the contamination level or the wrinkling level of the clothes in which the contamination or wrinkling is sufficiently removed via washing by the washing machine while the contamination or wrinkle is not removed via refreshing by the clothing treating apparatus. The reference value may be stored in a form of a table on a server or the like, or may be pre-stored in a storage of the clothing treating apparatus.

For example, the reference value may be determined based on whether the contamination of the clothing having the reference value may be removed using water or the like.

Upon detecting that the contamination level or the wrinkling level of the clothes is above the reference value, the clothing treating apparatus may transmit information to the washing machine or the server that the clothing should be subject to washing. For example, the clothing treating apparatus may transmit information on the contamination level or the wrinkling level of the clothes to the server or the washing machine. Then, the server or the washing machine may determine a washing course or washing option corresponding to the contamination level or the wrinkling level of the clothes.

A button indicating the washing course or washing option may be indicated on a display of the washing machine when the washing machine is turned on, so that the user does not need to select a course or option, but presses the button.

In another example, an input interface of the washing machine is activated so that the user may reject the recommended course or option and perform a course or option desired by the user.

Technical Effect

According to the present disclosure, the home appliance that may wash or refresh the clothing may detect the state or the contamination level of the clothes.

According to the present disclosure, the state or the contamination level and wrinkling level of the clothes may be detected even when the clothing is not in contact with water.

According to the present disclosure, a course or option corresponding to the state, the contamination level, or the wrinkling level of the clothes may be automatically recommended to the user.

According to the present disclosure, specific clothing having the high wrinkling or contamination level may be subject to intensive washing or refreshing.

According to the present disclosure, the home appliance may grasp the state or the contamination level of the clothes and recommend using another home appliance based on the state or the contamination level of the clothes.

According to the present disclosure, one home appliance may automatically determine a course or option based on information received from another home appliance.

DETAILED DESCRIPTION

Figure 1:
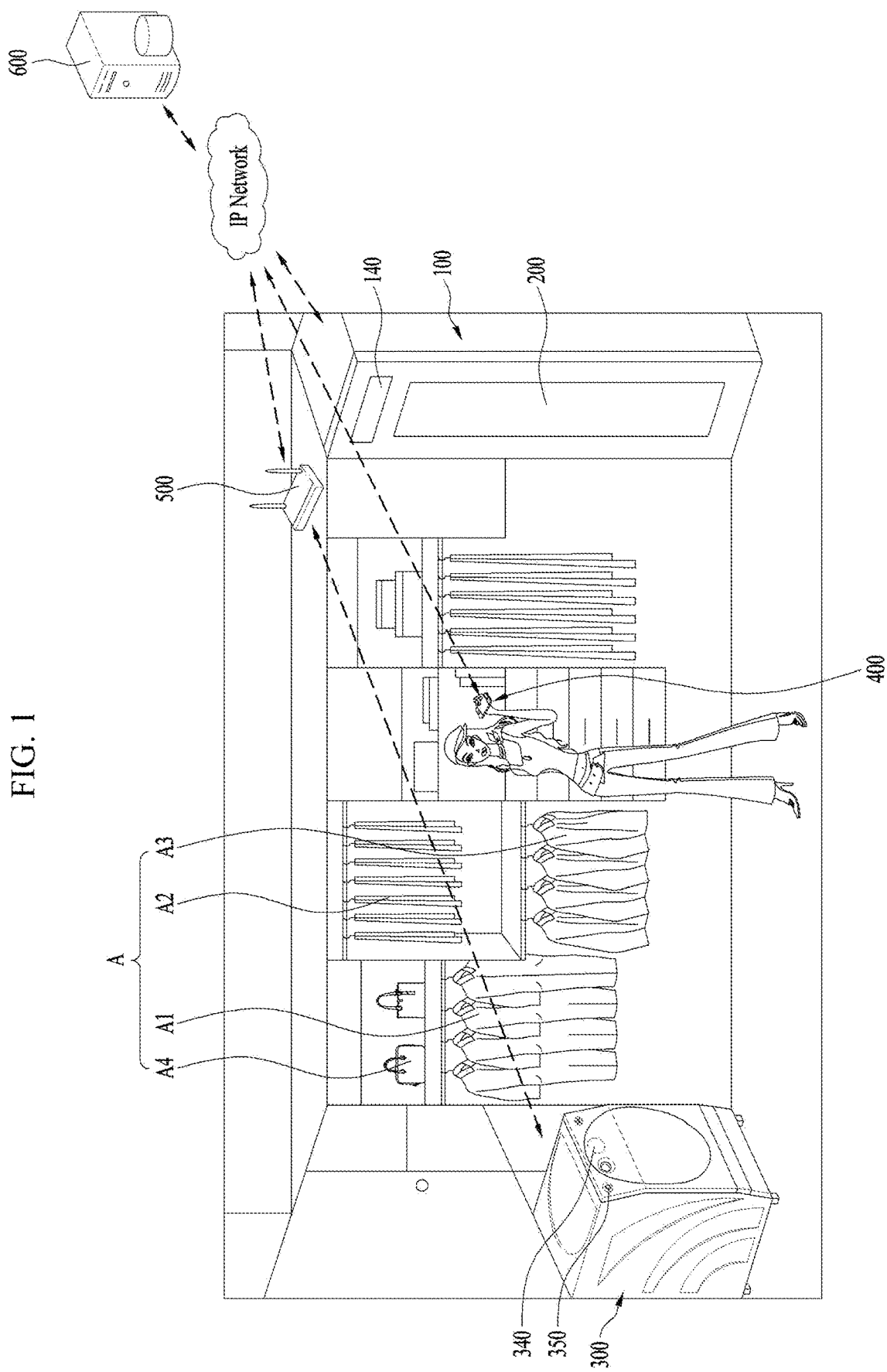
FIG. 1 shows an on-line system according to the present disclosure.

Hereinafter, exemplary embodiments disclosed herein will be described in detail with reference to the accompanying drawings. Herein, the same or similar reference numerals are allocated to the same or similar components in different embodiments. Descriptions thereof are replaced with first descriptions thereof. As used herein, the singular forms "a" and "an" are intended to include the plural forms as well, unless the context clearly indicates otherwise. Further, in describing the embodiments disclosed herein, when it is determined that detailed descriptions of a related known component may obscure the gist of the embodiments disclosed herein, the detailed descriptions thereof may be omitted. Further, it should be noted that the accompanying drawings are presented for easy understanding of the embodiments disclosed herein and should not be construed as limiting the technical spirit disclosed herein to the accompanying drawings.

FIG. 1 shows an on-line system according to one embodiment of the present disclosure including a plurality of home appliances.

A plurality of home appliances that may be controlled by a specific user may be arranged indoors, for example, in a home. Further, a plurality of clothes A that may be worn by the specific user may be arranged or stored indoors, for example, in a home.

The plurality of home appliance may include a washing machine 300 capable of washing and drying at least one of the plurality of clothes A using detergent, etc., and a clothing treating apparatus 100 capable of supplying hot-air or steam to at least one of the plurality of clothes A and refreshing the at least one of the plurality of clothes A.

The plurality of clothes A may include at least one of one or more overcoats A1 such as coats or jumpers, one or more tops A2 such as a shirt or blouse, T-shirt, one or more bottoms A3 such as pants or skirts, and accessory A4 such as a bag or sunglasses, noble metal, or a scarf. Clothes such as one-piece dress which may not be classified as a top or bottom may be collectively referred to as an overcoat.

The clothing treating apparatus 100 may include a refreshing-related input interface 150 that receives commands to perform arbitrary courses or options that may refresh at least one of the clothes A, and a refreshing-related output interface 140 that may output a state of the course or option. The refreshing-related output interface 140 may be configured to output a signal received from a refreshing-related main controller 180 using a sound or a text. For example, the refreshing-related output interface 140 may include a liquid crystal display or a speaker.

Further, the washing machine 300 may include a washing-related input interface 350 that receives a command to perform an arbitrary course or option that may wash at least one of the clothes A, and a washing-related output interface 340 that may output the state of the course or option. Accordingly, the user may input target clothes A into the clothing treating apparatus 100 or the washing machine 300 and then directly input the command to individually control and operate the clothing treating apparatus 100 or the washing machine 300.

In one example, the user may want to remotely control the washing machine 300 and the clothing treating apparatus 100, or to operate the washing machine 300 and the clothing treating apparatus 100 in conjunction with each other. Further, the user may want to actively familiarize him/her with or utilize the various functions of the washing machine 300 and the clothing treating apparatus 100.

To this end, the on-line system according to one embodiment of the present disclosure may include a server 600 through which the user may remotely control the washing machine 300 and the clothing treating apparatus 100 or perform pairing therebetween.

The server 600 may provide external information including regional information or weather information necessary for the washing machine 300 and the clothing treating apparatus 100, and may deliver various programs thereto and perform updates thereof. The server 600 may be provided from a company who manufactures and sells the clothing treating apparatus 100 and the washing machine 300. Accordingly, the clothing treating apparatus 100 and the washing machine 300 may be connected to the server 600 to perform a command transmitted from the server 600, or use information or algorithms provided from the server 600.

In one example, the clothing treating apparatus 100 or the washing machine 300 may be directly connected to the server 600 for communication therebetween, or may be configured to connect to an access point (AP) 500 to communicate with the server 600.

Therefore, the server 600 may register an unique device ID of each of the clothing treating apparatus 100 and the washing machine 300 via the AP 500, or store port information or IP information of the AP 500 in association with the clothing treating apparatus 100 and the washing machine 300.

In one example, the user using the clothing treating apparatus 100 or the washing machine 300 may remotely receive a service request to control the clothing treating apparatus 100 and the washing machine 300, or may request specific functions to the server 600.

Therefore, the on-line system according to one embodiment of the present disclosure may include an external terminal device 400 to allow the user to directly access the server 600 to control the clothing treating apparatus 100 and the washing machine 300, or to request various services provided from the server 600. The external terminal device 400 may refer to a device such as a mobile phone, a smartphone, a notebook, and a computer, which is separate from the home appliance or the server and may include devices having a communication module to enable communication with an external component.

An application program that may allow the external terminal device 400 to connect to the server 600 may be installed on the external terminal device 400. Accordingly, the external terminal device 400 may communicate directly with the server 600, and the server 600 may communicate with the clothing treating apparatus 100 and the washing machine 300.

As a result, the user may request a remote service via the external terminal device 400 and easily grasp information such as service execution and completion. Further, the clothing treating apparatus 100 and the washing machine 300 may be controlled by the external terminal device 400 while not being directly connected to the external terminal device 400.

In one example, the clothing treating apparatus 100 has usually a vertical dimension larger than that of the washing machine 300. That is, the clothing treating apparatus 100 generally has a vertical dimension greater than a horizontal dimension to accommodate unfolded clothing therein. For example, the clothing treating apparatus 100 may be taller than the user. Further, due to the nature of the clothing treating apparatus 100, the clothing treating apparatus 100 may be disposed where the clothes A is stored. Therefore, when the clothing treating apparatus 100 may act as a mirror, the user may not move to an actual mirror when wearing the clothes A.

In one example, both the clothing treating apparatus 100 and the washing machine 300 among the home appliances may treat the clothing. Therefore, the user may not know exactly whether to refresh her/his clothing using the clothing treating apparatus 100 or wash the clothing using the washing machine 300.

Therefore, in the on-line system according to one embodiment of the present disclosure, the clothing treating apparatus 100 may be configured to determine the wrinkling level or the contamination level of the clothes. When the contamination level is high, the clothing treating apparatus 100 may be configured to indicate to the user that washing of the clothing is performed using the washing machine 300.

Furthermore, the clothing treating apparatus 100 may directly transfer the contamination level or the material of the clothing to the washing machine 300 via the server 600 or the AP 500, etc. to allow the washing machine 300 to determine a suitable course or option based on the contamination level or the material.

In one example, the user may not be able to accurately recognize or be familiar with the course or option provided from the clothing treating apparatus 100. Therefore, the on-line system according to one embodiment of the present disclosure may be configured so that the clothing treating apparatus 100 may automatically determine an appropriate course or option based on an analyzing result of the wrinkling level or the contamination level of the clothes.

Figure 2:
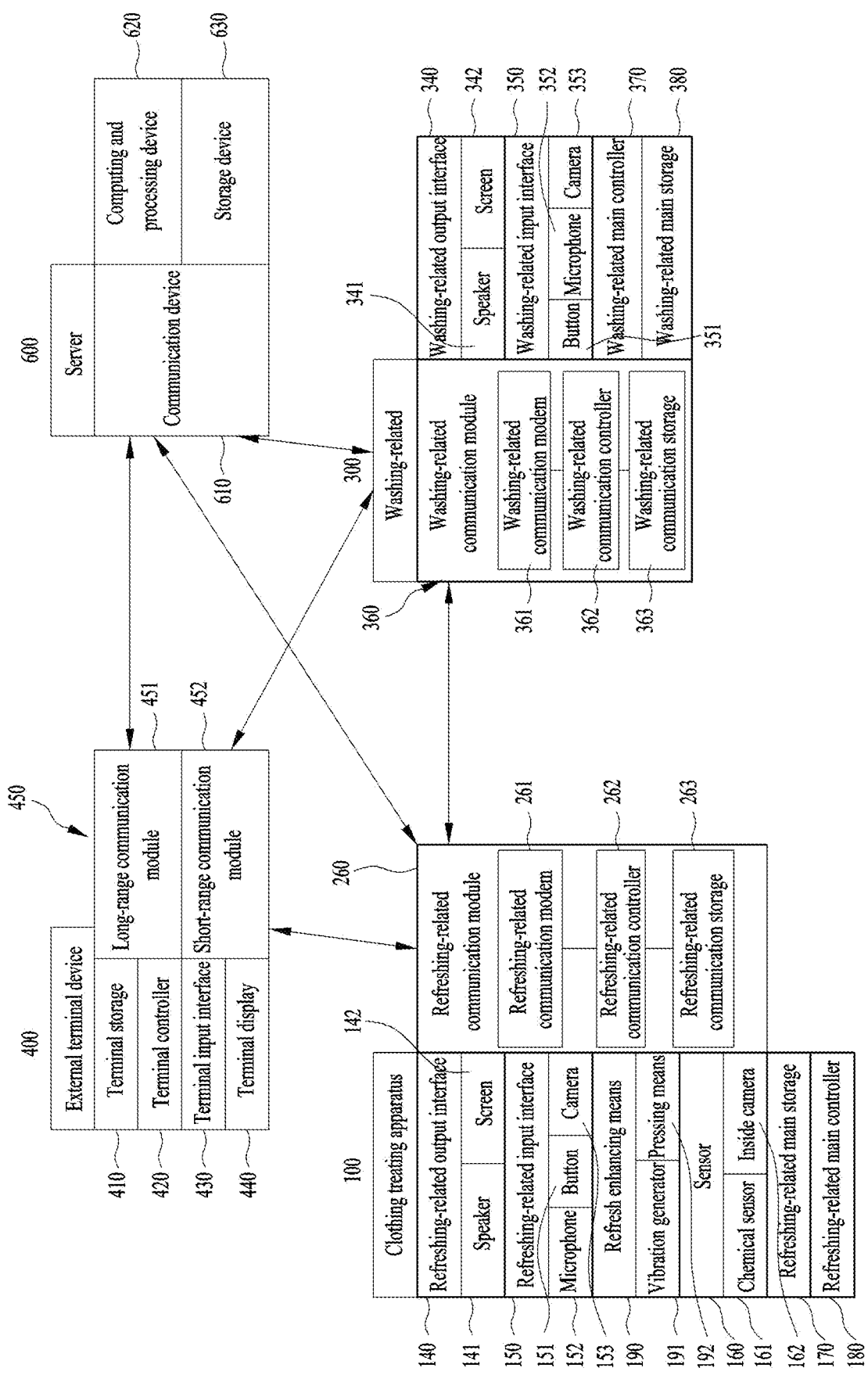
FIG. 2 shows a structure of the on-line system according to the present disclosure.

FIG. 2 shows one embodiment of a structure of on-line system according to the present disclosure capable of performing the above-described functions.

The external terminal device 400 of the on-line system according to one embodiment of the present disclosure includes a terminal input interface 430 for inputting a command to operate the external terminal device, a terminal display 440 that displays the state of the external terminal device 400 and information received from server 600, a long-range communication module 451 configured to communicate with the server 600 disposed in a remote location, a short-range communication module 452 configured to communicate with the home appliances such as the clothing treating apparatus 100 or the washing machine 300 disposed adjacent thereto, a terminal controller 420 that controls the components of the external terminal device, and a terminal storage 410 that stores information received from the terminal input interface or the communication module.

The short-range communication module may be configured to communicate with a communication device within a certain distance, for example, using radio frequency based communication protocols such as WIFI, Bluetooth, and ZigBee. The long-range communication module may be configured to communicate with a communication device at a remote location via a base station or a communication network using 3G, LTE, or 4G.

The server 600 according to one embodiment of the present disclosure may include a communication device 610 configured to communicates with the external terminal device 400 or communicate with the home appliance such as the clothing treating apparatus 100 or the washing machine 300, or the AP 300, a computing and processing device 620 that generates or analyzes various control signals, and a storage device 630 that stores information generated or received by or from the external terminal device, the home appliance, or the computing and processing device.

The clothing treating apparatus 100 according to one embodiment of the present disclosure may include a refreshing-related main storage 170 in which an arbitrary course or option to refresh the clothing is stored, a refreshing-related main controller 180 to execute one course or option of the arbitrary courses or options, and a refreshing-related communication module 260 configured to communicate with the home appliance such as the washing machine 300, the server 600, the external terminal device 400 or the AP 500.

The refreshing-related main controller 180 may be configured to prevent standby power consumption by cutting off power when an operation of the clothing treating apparatus 100 is completed or stopped. However, the refreshing-related main controller 180 may be configured to allow the refreshing-related communication module 260 to maintain a state in which power is always supplied to the refreshing-related communication module 260 such that the refreshing-related communication module 260 maintains a communication state with the server 600.

The clothing treating apparatus 100 may further include a hot-air or steam supply 700 capable of removing contaminations or wrinkling of the clothing. The hot-air or steam supply 700 may be configured to supply hot-air or steam depending on the course or option performed by the refreshing-related main controller 180.

The clothing treating apparatus 100 may include a refreshing-related input interface 150 configured to input a command to perform one of the arbitrary courses or options, and a refreshing-related output interface 140 to output the state of the clothing treating apparatus or information received from the refreshing-related communication module 260.

For example, the refreshing-related input interface 150 and the refreshing-related output interface 140 may be disposed on an outer face of the clothing treating apparatus 100 to facilitate user access thereto. The refreshing-related input interface 150 may include a refreshing-related button 152 for inputting the washing course/option or the power, a refreshing-related microphone 151 for receiving sound signals such as voice commands, and a refreshing-related camera 153 for obtaining image signals. Further, the refreshing-related output interface 140 may include a washing-related screen or a refreshing-related screen 142 for presenting information using an image, and a refreshing-related speaker 141 for outputting a sound signal. Further, the refreshing-related output interface 140 may be embodied as a touch panel and configured to serve as a refreshing-related input interface.

The refreshing-related communication module 260 may include a refreshing-related communication modem 261 configured to communicate with the server 600, the AP 300, the external terminal device 400, and the home appliances such as the washing machine 300, a refreshing-related communication controller 262 configured to control the refreshing-related communication modem 261, and a refreshing-related communication storage 263 that stores information received from the refreshing-related communication modem 261 or information generated from the refreshing-related communication controller 262. The refreshing-related communication module 260 may be configured to act as a short-range communication module and a long-range communication module as in the external terminal device 400. The refreshing-related communication module 260 may be configured to receive a recommendation algorithm provided from the server 600 and store the algorithm in the refreshing-related communication storage 263, and transmit the recommendation algorithm to the refreshing-related main storage 170.

The recommendation algorithm may be a program that determines a course or option corresponding to the material, contamination level, and wrinkling level of the clothes among the courses or options in which the refreshing-related main controller 180 may activate a refresh enhancing means 190, or may be a recommended course or option itself.

In one example, the refreshing-related communication module 260 may be configured to always receive a wrinkling prediction algorithm that may calculate a portion of the clothes at which wrinkling may occur according to a type of the clothes from the server 600 and store the algorithm in the refreshing-related communication storage 263. The refreshing-related communication module 260 may be configured to deliver the wrinkling prediction algorithm to the refreshing-related main storage 170.

The wrinkling prediction algorithm may be used to supply hot-air or steam intensively to a portion of the clothes where wrinkling frequently occurs or wrinkling occurrence is predicted, when the refreshing-related main controller 180 activates the refresh enhancing means 190.

The wrinkling prediction algorithm may predict the portion of the clothes where wrinkling occurs according to the types of the clothes, for example, the overcoat A1, the top A2, and the bottom A3. For example, a portion where wrinkling occurs may be a portion corresponding to a joint of a human body. Alternatively, a portion where wrinkling is expected to occur according to a motion of the human body may be identified statistically.

The clothing treating apparatus 100 may include a sensor 160 capable of recognizing or detecting the contamination level or the wrinkling level of the clothes A. The sensor 160 may be configured to recognize a state of a space in which clothing is accommodated.

For example, the sensor 160 may include a gas sensor 161 that senses a gas fluid state inside the clothing treating apparatus 100, or an inside camera 162 that may image the clothing or the space in which the clothing is accommodated.

The gas sensor 161 may detect the contamination level of clothes by detecting changes in the gas fluid state. The gas sensor 161 may detect the contamination level of clothes by detecting changes in a density and compositions of the gas fluid.

Further, the inside camera 162 may directly image the clothing, and the refreshing-related main controller 180 may calculate the contamination level or the wrinkling level of the clothes based on the image.

The refreshing-related main controller 180 may be configured to calculate a contamination level or the wrinkling level based on the state of the clothing receiving space as detected by the sensor 160 and determine a suitable course or option among the arbitrary courses or options, based on the contamination level or the wrinkling level.

Further, the refreshing-related main controller 180 may transmit information about the contamination level or the wrinkling level to the washing machine 300 via the refreshing-related communication module 260 when the contamination level or the wrinkling level is higher than a limit value.

The refreshing-related communication module 260 may transmit information on the contamination level or the wrinkling level to the server 600 or the washing machine 300.

Further, the refreshing-related main controller 180 may display recommendation that the clothing should be washed in the washing machine 300 on the refreshing-related output interface 140.

The washing machine 300 according to one embodiment of the present disclosure includes a washing-related main storage 380 in which an arbitrary course or option to remove foreign substances from clothing is stored, a washing-related main controller 370 performing one course or option among the arbitrary courses or options, and a washing-related communication module 360 configured to communicate with the external terminal device 400 or the AP 300, and the refreshing-related communication module 260.

The washing-related main controller 370 prevents standby power consumption by cutting off the power supply when the operation of the washing machine 300 is finished or stopped. However, the washing-related main controller 370 may be configured to allow the washing-related communication module 360 to always maintain a state in which power is supplied thereto to maintain the communication state thereof.

The washing machine 300 may include a washing-related input interface 350 for receiving a command to perform the arbitrary course or option, and a washing-related output interface 340 that outputs the state of the washing machine 300. The washing-related input interface 350 and the washing-related output interface 340 may be configured in a similar manner to those of the clothing treating apparatus 100.

The washing-related communication module 360 includes a washing-related communication modem 361 configured to communicate with at least one of the server 600, the AP 500, the external terminal device 400, and the clothing treating apparatus 100, a washing-related communication controller 362 configured to control the washing-related communication modem 361, and a washing-related communication storage 363 that stores information received from the washing-related communication modem 362. The washing-related communication module 360 may be configured to act as a short-range communication module and a long-range communication module as in the external terminal device 400.

As a result, the clothing treating apparatus 100 and the washing machine 300 may be configured to communicate with each other via the refreshing-related communication module 260 and the washing-related communication module 360 or with the external terminal device 400 and the server 600 via the refreshing-related communication module 260 and the washing-related communication module 360. Thus, the washing machine 300 may receive and store information about the contamination level or the wrinkling level of the clothes in advance via the washing-related communication module 360. Then, the washing-related main controller 370 may determine an appropriate course or option based on the contamination level or the wrinkling level. In another example, the server 600 may pre-determine a course or option suitable for the clothing state and deliver the same to the washing-related communication module 360.

In one example, the refreshing-related main storage 170 may store an utterance list that matches a user's voice command and the button 153 of the refreshing-related input interface 150 with each other. When the refreshing-related input interface 150 receives a voice command via the microphone 153, the refreshing-related input interface 150 may be configured to compare the voice command with the utterance list with each other and select a command based the comparing result and then send the selected command to the refreshing-related main controller 180 or the communication module 260.

When the refreshing-related main controller 180 may directly receive and process the command, the refreshing-related main controller 180 may operate the components of the clothing treating apparatus 100 according to the command. Further, when the communication module 260 receives the command, the module 260 may transmit the command to the server 600 to request transmission of a command to operate the components of the clothing treating apparatus 100 from the server 600. The server 600 may be configured to allow the clothing treating apparatus 100 to execute the corresponding command via the communication module 260.

Figure 3:
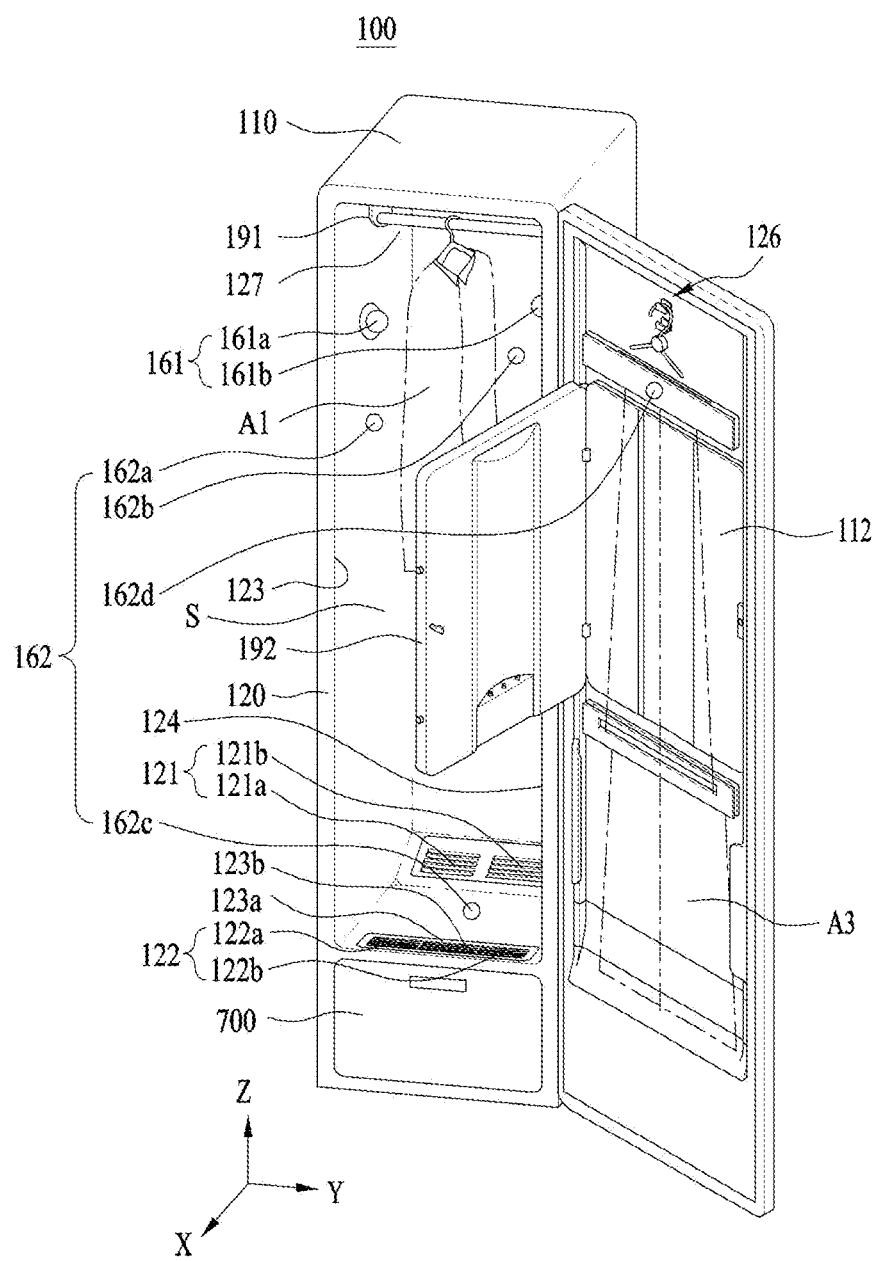
FIG. 3 shows a structure of a clothing treating apparatus according to the present disclosure.

FIG. 3 shows a detailed structure of a clothing treating apparatus according to one embodiment of the present disclosure.

The clothing treating apparatus 100 according to one embodiment of the present disclosure includes a cabinet 110 having a front opening, a door 111 that is pivotally disposed at the cabinet 110 to open and close the opening, an inner casing 120 which is disposed in the cabinet and which provides a clothing receiving space S in which clothes A is accommodated, a hot-air or steam supply 700 communicating with the inner casing 120 to supply at least one of hot-air or steam to the clothing receiving space S, and hanger supports 126 and 127 that are disposed on the inner casing 120 and/or the door 111 to support hangers holding the clothes A inside the clothing receiving space S.

The cabinet 110 may be constructed to define an appearance of the clothing treating apparatus and may have a vertical dimension greater than a horizontal dimension. As a result, the shown overcoat A1 as well as the bottom A3 that extends vertically in an unfold manner may be accommodated in the inner casing 120. Thus, unnecessary wrinkles may not occur in the received clothes A.

The cabinet 110 may be made of a metal material. As long as the cabinet may maintain a strength, the cabinet may be made of a resin material such as reinforced plastic.

The inner casing 120 may be made of a material that is not physically deformed by or chemically reacted with foreign substances released from the clothes A or the hot-air or steam supplied from the supply. For example, the inner casing may be made of a styrene resin series such as ABS and ASA. The inner casing 120 may be constructed to communicate with the hot-air or steam supply 700, so that hot-air or steam is supplied from the hot-air or steam supply 700 to the clothing receiving space S or air is discharged to the hot-air or steam supply 700. To this end, the inner casing 120 may have a plurality of through-holes 121, 122, and 123 defined therein communicating with the hot-air or steam supply 700.

In one example, the hot-air or steam supply 700 may be disposed separately from the inner casing 120. The hot-air or steam supply 700 may be disposed under the inner casing 120 to uniformly supply heated air or steam at a relatively low density to the inner casing 120.

In one example, the door 111 may be pivotally coupled to the cabinet 100 and may be constructed to open and close the opening. The door 111 may be constructed to shield a front face of the hot-air or steam supply 700 as well as the inner casing 120. This not only prevents the hot-air or moisture supplied to the inner casing 120 from leaking to an outside, but also prevents heat generated from the hot-air or steam supply 700 from being transferred to the outside.

Since the door 111 is constructed to open and close the front opening of the inner casing 120, an inner peripheral face of the inner casing 120 and an inner face of the door 111 may define the clothing receiving space S.

The hanger support may include a first hanger support 127 constructed to support a hanger holding clothes A inside the inner casing 120, and a second hanger support 126 constructed to support a hanger holding clothes A on the inner face of the door 111.

Hereinafter, description will be made on the assumption that a hanger holding the overcoat A1 is supported on the first hanger support 127 and a hanger holding the bottom A3 is supported on the second hanger support 128.

The first hanger support 127 has a bar shape inside the inner casing 120 so that the hanger holding the overcoat A1 may be supported thereon in the clothing receiving space S. The first hanger support 127 may be disposed on a top face of the inner body 210 or may be disposed on a top of a side face of the inner body 210 so that the hanger holding the overcoat A1 may be supported thereon in the inner casing 120 in a fully unfolded state. The first hanger support 127 on which the hanger holding the clothes A in an unfolded state by its own weight is supported is mounted on the inner casing 120 to evenly expose hot-air or steam supplied from the hot-air or steam supply 700 to the overcoat A1.

The second hanger support 126 may support the hanger holding the bottom A3 on the inner face of the inner casing 120 or a location adjacent to the door 111. As a result, the second hanger support 126 allows one face of the bottom A3 to be in close contact with the inner face of the inner casing 120 or the door 111 to eliminate wrinkling therefrom.

In one example, the clothing treating apparatus 100 according to one embodiment of the present disclosure may further include the refresh enhancing means 190 that maximizes the refresh effect of the clothes A.

The refresh enhancing means 190 may include a vibration generator 191 connected to the first hanger support 127 to vibrate the first hanger support 127, and pressing means 192 disposed under the second hanger support 126 to pressurize the clothing.

The vibration generator 191 may be embodied as a module including a motor, pulley, and a cam to allow the first hanger support 127 to reciprocate in a longitudinal direction or along an arc path. Thus, the hot-air or steam may be evenly supplied to the surface of the overcoat A1 supported on the first hanger support 127, and foreign substances attached to the overcoat A1 may be removed therefrom.

The pressing means 192 may be configured to be pivotally coupled to at least one of the inner casing 120 or the door 111 to press the bottom A3. The pressing means 192 may manually press the bottom A3. The pressing means 192 may have a hinge rotatably coupled to the inner casing 120 or the door 111, etc. to automatically press the bottom A3 using a motor. The door 111 or the inner casing 120 may further include a pressed clothing seat 112 to face-contact the pressing means 192. Each of the pressing means 192 and the pressed clothing seat 112 may have a plate shape. The pressed clothing seat 112 may apply a pressure to the bottom A3 in reaction to a pressing force from the pressing means 192.

The sensor 160 may be configured to sense the state of the clothing receiving space S or the state of the received clothing.

The sensor 160 may include the gas sensor 161 that may determine the air contamination level inside the clothing treating apparatus 100 or the inside camera 162 that images the clothing.

The gas sensor 161 may be configured to detect the density or the concentration of foreign substance molecules flowing in the clothing receiving space S, or to detect variations thereof. The gas sensor 161 may include a plurality of gas sensors arranged and spaced apart from each other along the inner face of the inner casing.

The refreshing-related main controller 180 may compute sensor values detected by the plurality of gas sensors 161 and determine, based on the values, a portion of the clothing receiving space S in which more contaminated clothing is placed.

The gas sensor may include a first gas sensor 161a disposed on one side inner face 123 of the inner casing and a second gas sensor 161b disposed on another side inner face 124 adjacent to or opposite to one side inner face 123. However, this is only one embodiment, and the gas sensor 161 may be additionally disposed at another location.

The gas sensor 161 may be a semiconductor gas sensor, or may be embodied as any sensor capable of detecting the concentration of gas in the air.

For example, the gas sensor 161 may detect the gas fluid state in the clothing receiving space S using a catalytic combustion scheme, an electrochemical scheme (such as a solution conduction scheme, a potentiostatic electrolysis scheme, a diaphragm electrode scheme), a thermal conductivity scheme, optical schemes (such as infrared ray absorption scheme, visible ray absorption scheme, optical interference scheme), electrical schemes (such as hydrogen ionization, thermal conduction, catalytic combustion, and semiconductor schemes) a reaction coloring scheme, a solution conductivity scheme, a solid electrolyte scheme, a gas chromatography scheme, etc.

Figure 4:
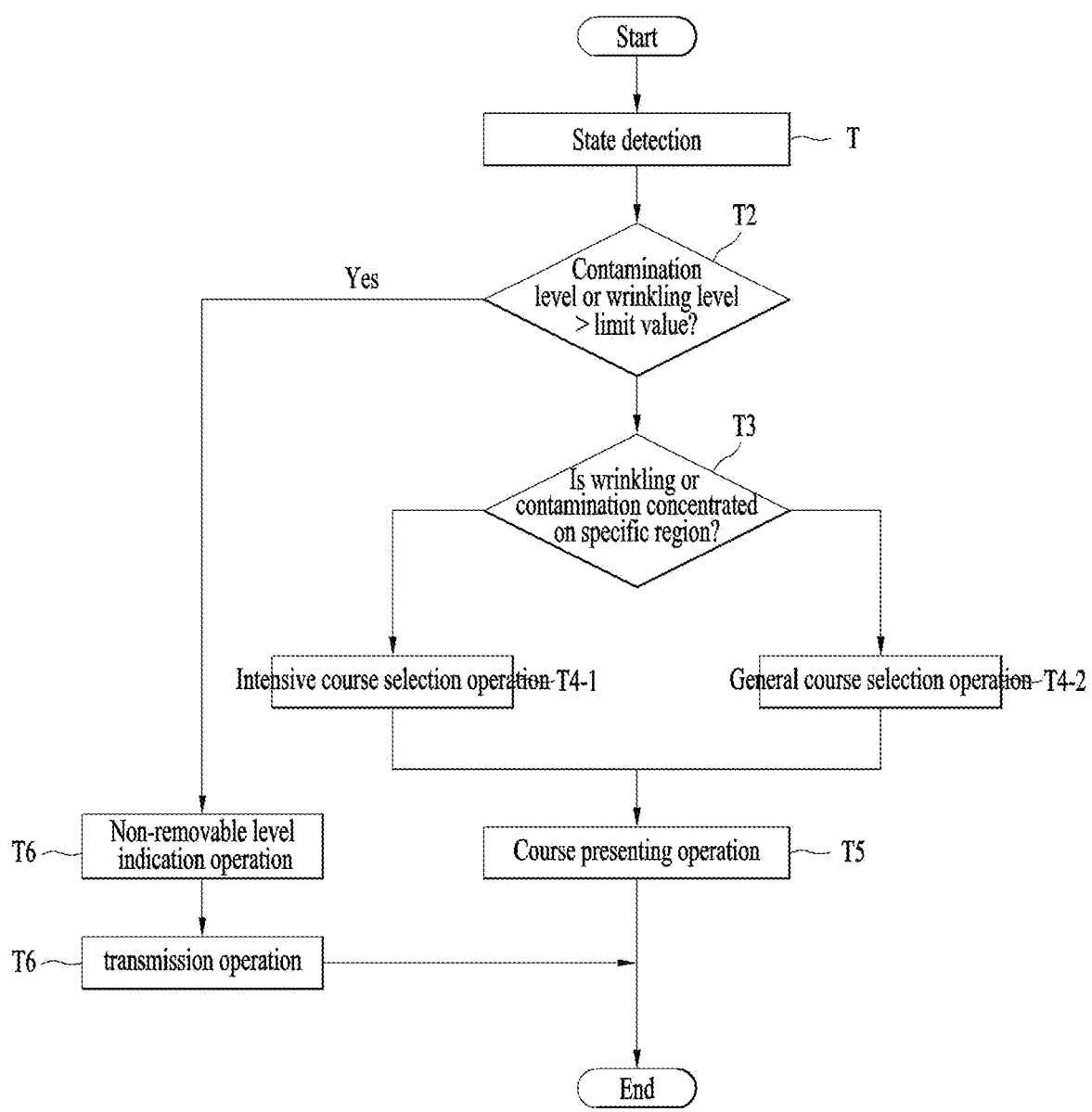
FIG. 4 shows a method for controlling the clothing treating apparatus according to the present disclosure.

FIG. 4 shows one embodiment of a control method utilizing the components of the clothing treating apparatus 100 according to one embodiment of the present disclosure.

The clothing treating apparatus 100 according to one embodiment of the present disclosure may perform a state sensing operation T1 in which when the clothing is put into the clothing receiving space s, the sensor 160 senses the state of the clothing receiving space S or the state of the clothing.

In the state sensing operation T1, the refreshing-related main controller 180 controls the gas sensor 161 to detect a change in the gas fluid state of the clothing receiving space S. In this connection, the refreshing-related main controller 180 may activate the hot-air or steam supply 700 to supply the hot-air or steam to the clothing. The gas sensor 161 may detect changes in the gas fluid state of the clothing receiving space S before and after the hot-air or steam supply 700 is activated. The refreshing-related main controller 180 detects a contamination level of the clothing based on the change.

For example, when the contamination level of clothes is low, the change in the measured value detected by the gas sensor 161 may be low. However, when the contamination level of the clothes is high, dust or foreign substances in the clothing may react with or be separated from the hot-air or steam. Therefore, the change in the measured value detected by the gas sensor 161 may be high.

In the state sensing operation T1, the refreshing-related main controller 180 controls the inside camera 162 to obtain an image of the clothing directly. The inside camera 162 may be embodied as a depth camera or may include a plurality of depth cameras spaced apart from each other. The refreshing-related main controller 180 may acquire a 3D image of the clothing.

The refreshing-related main controller 180 may analyze the image and calculate the wrinkling level and the contamination level of the clothes. For example, the refreshing-related main controller 180 may determine the wrinkling level or the contamination level of the clothes based on a comparing result between images of a first portion and a second portion of the clothing. In other words, the refreshing-related main controller 180 may detect that a certain portion of the clothing has more wrinkles or has a different color or a larger size than those of other portions and determine the wrinkling level or the contamination level of the certain portion.

Further, the refreshing-related main controller 180 may compare normal clothing information stored in the refreshing-related main storage 170 with the clothing image as acquired and determine the wrinkling level or the contamination level of the clothes based on the comparing result.

Further, the refreshing-related main controller 180 may detect the material of clothes based on an analyzing result of the image.

The refreshing-related main controller 180 may perform a limit-value checking operation T2 which the controller 180 checks whether the contamination level or the wrinkling level of the clothes detected via the sensor 160 is equal to or higher than the limit value. The limit value may be a maximum value of the contamination level or the wrinkling level at which the clothing treating apparatus 100 is able to eliminate contaminations or wrinkling from the clothing using the hot-air or steam supply 700.

The limit value may be a maximum value of the contamination level or the wrinkling level at which the contaminations or wrinkling is able to be removed from the clothing using the hot-air or steam, or may be a minimum value thereof at which foreign substances are able to be removed from the clothing by washing the clothing using detergent and water.

For example, when the refreshing-related main controller 180 detects that a fat-soluble foreign substance is attached to the clothing, or that the foreign substance is attached thereto such that the foreign substance is not able to be removed therefrom to an amount below a predefined value using the hot-air or steam, the refreshing-related main controller 180 may determine that the contamination level or the wrinkling level exceeds the limit value.

When the contamination level or the wrinkling level of the clothes exceeds the limit value, the refreshing-related main controller 180 may perform a non-removable level indication operation T6 to control the refreshing-related output interface 130 to indicate that the contamination or the wrinkling of the clothes is not able to be removed using the hot air or steam.

In the non-removable level indication operation T6, the refreshing-related output interface 130 indicates that the contamination level or the wrinkling level of the clothes exceeds the limit value, that the clothing is not able to be treated using the clothing treating apparatus 100, and/or that it is preferable that the clothing should be treated using the washing machine 300.

Thus, even though the user does not know which home appliance among the clothing treating apparatus and the washing machine should treat the clothing, the user may be informed of exactly which home appliance for the user to use. As a result, the user may execute the appropriate course or option in the home appliance suitable for the clothing.

The user may acknowledge the indication displayed on the refreshing-related output interface 140. For example, the user may enter a command to approve the indication displayed on the refreshing-related output interface 140 via the refreshing-related input interface 150, or may press an undo button to approve the non-removable level indication on the refreshing-related output interface 140.

In this case, the refreshing-related main controller 180 may perform a transmission operation T7 in which the refreshing-related main controller 180 controls the refreshing-related communication module 160 to transmit clothing information including the contamination level and the wrinkling level, and the clothing material to the server 600 or the washing machine 300. The server 600 or the washing machine 300 may receive the contamination level, the wrinkling level, or the clothing material and determine the corresponding course or option thereto and recommend the same. This may eliminate an inconvenience situation in which the user re-enters the course or option on the washing machine again. This will be described later.

The refreshing-related main controller 180 may perform a concentrated-region determination operation T3 to determine whether wrinkling or contamination is concentrated on a specific region in the clothing receiving space S when the detected state of the clothing is lower than the limit value.

In the concentrated-region determination operation T3, when a specific gas sensor 161 among the plurality of gas sensors 161 detects a change in the gas fluid state above a certain value, the refreshing-related main controller 180 may determine that a contamination level at a location near the specific gas sensor 161 is high.

Further, in the concentrated-region determination operation T3, images captured by one or more inside cameras 162 may be analyzed and then a target region having a high wrinkling level or a high contamination level may be detected based on the analysis result.

Therefore, in the concentrated-region determination operation T3, it is checked whether the contamination level in a specific region of the clothing receiving space S exceeds a specific value, or whether there is a target region in which the contamination level of specific clothing exceeds the specific value. The specific value may mean a level higher by a predefined amount than an average contamination level or an average wrinkling level of the clothes receiving space S.

For example, in the concentrated-region determination operation T3, when the contaminated regions or wrinkled regions are evenly distributed, or the contamination level of the contaminated region or the wrinkling level of the specific region is not high, it may be determined that there is no target region.

However, in the concentrated-region determination operation T3, when the contaminated region or wrinkled region is concentrated, this region may be determined as the target region. Alternatively, when the contamination level of the contaminated region or the wrinkling level of the specific region is very high, this region may be determined as the target region.

When the presence or absence of the target region is determined in the concentrated-region determination operation T3, a course selection operation T4 for determining a course or option may be performed. The course selection operation T4 may include an intensive course selection operation T4-2 and a general course selection operation T4-1.

As described above, the refreshing-related main storage 170 or the server 600 may store therein an arbitrary course or option to refresh the clothing as executed by controlling the hot-air or steam supply 700. The refreshing-related main controller 180 or the server 600 may determine or select a course or option corresponding to the contamination level or the wrinkling level among the arbitrary courses or options.

The refreshing-related main controller 180 may detect the contamination level or the wrinkling level via the sensor 160 and may determine a specific course and option among many courses or options for supplying the hot-air or steam.

For example, the course or option as executed may vary depending on the state of the same clothes. That is, when the same clothes is placed in the clothing receiving space S, and the contamination level thereof on a current day is higher than that on other days, a course or option having a stronger hot-air and a larger duration may be determined. When the wrinkling level is high, a course or option having a stronger steam and a larger duration may be determined.

Further, the refreshing-related main controller 180 may control the hot-air or steam supply 700 such that the hot-air or steam is intensively supplied to a region in the clothes receiving space S where the contamination level or the wrinkling level is higher than the reference value, based on the measured value detected by the sensor 160.

Further, the refreshing-related main controller 180 may control the hot-air or steam supply 700 such that the hot-air or steam is intensively supplied to a portion of the specific clothing received in the clothing receiving space S where the contamination level or the wrinkling level is higher than the reference value, based on the measured value detected by the sensor 160.

In this connection, when the refreshing-related main controller 180 determines the course or option, the refreshing-related main controller 180 may select one of the intensive course or the general course.

The intensive course may perform the intensive supply of the hot-air or steam to the target region when performing any course or option. In the general course, the hot-air or steam is evenly supplied to the entire clothing receiving space S when performing any course or option.

When the target region is determined to be absent in the concentrated-region determination operation T3, the general course selection operation T4-1 performing the general course may be determined. In the general course selection operation T4-1, execution of a course or option corresponding to the material, the contamination level, or the wrinkling level of clothes as detected by the sensor 160 is determined.

When it is found that the target region exists in concentrated-region determination operation T3, the intensive course selection operation T4-2 performing the intensive course may be determined. In the intensive course selection operation T4-2, a course or option corresponding to the material, contamination level or the wrinkling level of clothes detected by the sensor 160 is determined.

In one example, when the course is determined in the course selection operation T4, a course presenting operation T5 in which this determined course is indicted on the refreshing-related output interface 140 may be performed.

The course presenting operation T5 refers to an operation in which a course or option determined by the refreshing-related main controller 180 or the server 600 is recommended to the user. As a result, even when the user is not familiar with any course or option or does not know exactly the state of the clothing, the user may execute the corresponding course or option.

In another example, the user may reject the indication displayed on the refreshing-related output interface 140 by entering the refreshing-related input interface 150. For example, the user may perform a refresh cycle of the clothing by pressing an execution button on the refreshing-related input interface 150 and selecting a course or option. In this way, a free will of the user may be respected.

Hereinafter, a structure or a specific embodiment in which the control method is performed will be described.

Figure 5:
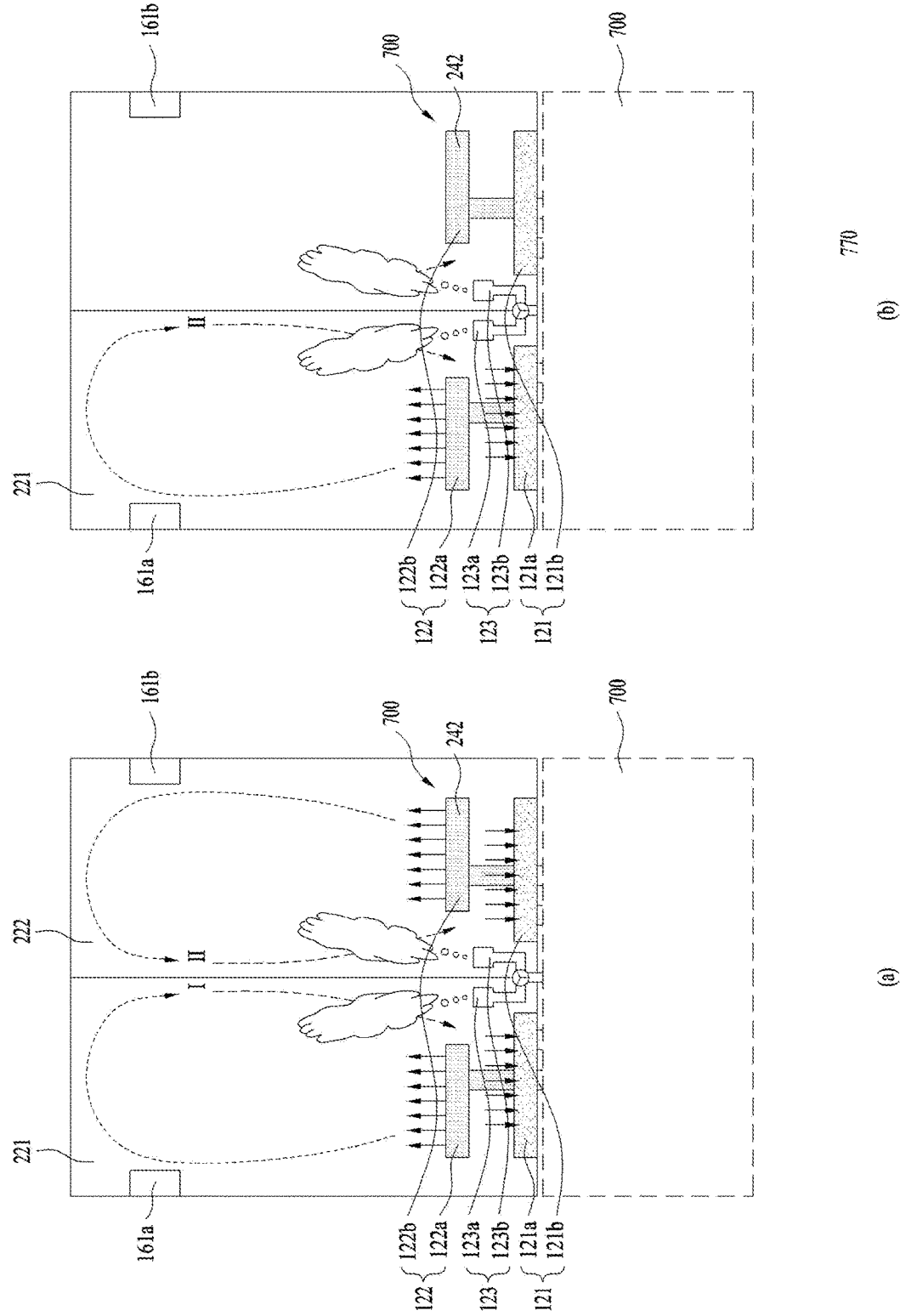
FIG. 5 shows an embodiment in which the clothing treating apparatus according to the present disclosure measures a contamination level of clothes.

FIG. 5 shows one embodiment in which the state checking operation T1 and the limit-value checking operation T2 or the concentrated-region determination operation T3 are performed.

Referring to (a) in FIG. 5, the inner casing 120 has an air intake hole 121 that sucks air from the clothing receiving space S, and an air discharge hole 122 that supplies hot-air to the clothing receiving space S, and a steam hole 123 that supplies steam to the clothing receiving space S.

The air intake hole 121 may be spaced apart from the air discharge hole 122 and steam hole 123. Alternatively, the air discharge hole 122 and the steam hole 123 may be adjacent to each other. For example, the air intake hole 121 may be disposed at a rear portion, and the air discharge hole 122 and the steam hole 123 may be disposed at a rear portion. This is to prevent the hot-air or steam from being absorbed into the air intake hole 121 as soon as the hot-air or steam is supplied to the clothing receiving space S.

The air intake hole 121 may include a first air intake hole 121a extending through the inner casing 120, and a second air intake hole 121b spaced apart from the first air intake hole.

The air discharge hole 122 may include a first air discharge hole 122a extending through the inner casing 120 and a second air discharge hole 122b spaced apart from the first air discharge hole.

The steam hole 123 may include a first steam hole 123a extending through the inner casing 120 and a second steam hole 123b spaced apart from the first steam hole.

The first air intake hole 121a and the first air discharge hole 122a and the first steam hole 123a may be positionally biased to one side of the inner casing 120, while the second air intake hole 121b, the second air discharge hole 122ba, and the second steam hole 123b may be positionally biased to the other side of the inner casing 120.

Further, the first air intake hole 121a and the first air discharge hole 122a and the first steam hole 123a may be adjacent to the first gas sensor 161a, while the second air intake hole 121b and the second air discharge hole 122ba and the second steam hole 123b may be adjacent to the second gas sensor 161b.

In this connection, the refreshing-related main controller 180 may perform the state checking operation T1 in which while air is sucked through the air intake hole 121 and air is discharged through the air discharge hole 122, all of the gas sensors 161 detect change in the gas fluid state of the clothing receiving space S, and the contamination level is detected based on the change. At the same time, the refreshing-related main controller 180 may perform the limit-value checking operation T2 in which whether the contamination level exceeds the limit value is checked.

For example, the refreshing-related main controller 180 may randomly divide the clothing receiving space S into a first zone 221 and a second zone 222.

The refreshing-related main controller 180 may supply hot-air to the first zone 221 and hot-air to the second zone 222 and determine the contamination level of each zone.

The refreshing-related main controller 180 may supply hot-air to the first zone 221 and the second zone 222 at the same time and recognize the contamination level of an entirety of the clothes receiving space S. Alternatively, the refreshing-related main controller 180 may selectively supply hot-air to the first zone 221 and the second zone 222, and may recognize separately the contamination levels of the first zone and the second zone.

When using the above method, the refreshing-related main controller 180 may detect a region in the clothing receiving space S having a high contamination level, or a region on which the contamination level is concentrated.

Referring to (b) in FIG. 5, the refreshing-related main controller 180 may circulate hot-air through the first air discharge hole 122a and the first air intake hole 121a and detect the gas fluid state change using the first gas sensor 161a (I direction), and may circulate hot-air through the second air discharge hole 122b and the second air intake hole 121b, and may detect the gas fluid state change using the second gas sensor 161b (II direction). Thus, the refreshing-related main controller 180 may check a region in the clothing receiving space S on which the contamination level is concentrated. In other words, the refreshing-related main controller 180 may perform the concentrated-region determination operation T3 to determine whether the target region exists in the clothing receiving space S, and if so, to identify the target region.

In this connection, when the target region is located near the first gas sensor 161a, the refreshing-related main controller 180 may perform an intensive course selection operation that intensively supplies hot-air or steam only in the I direction.

In this connection, when the target region does not exist, the refreshing-related main controller 180 may supply hot-air or steam to the entire region as shown in (a) in FIG. 5.

Figure 6:
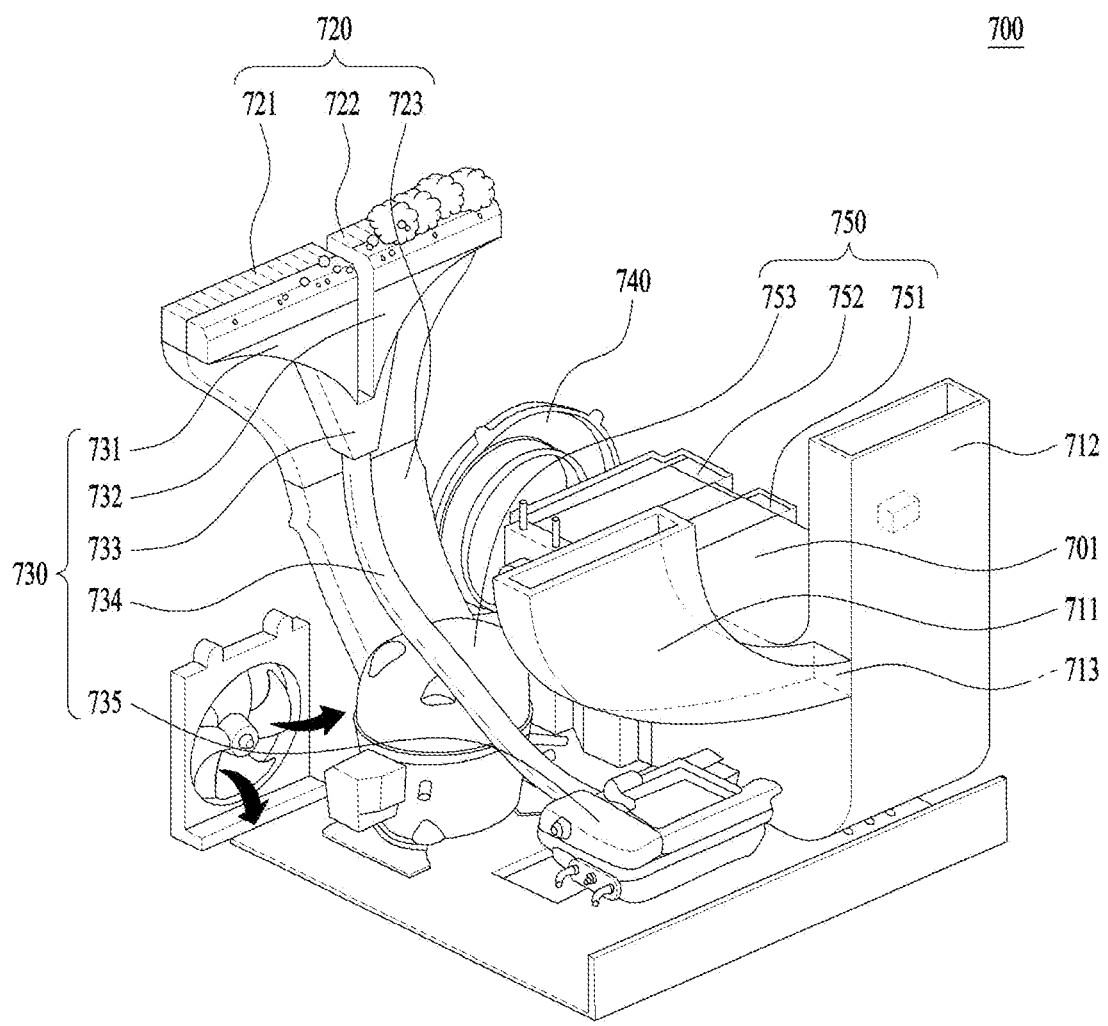
FIG. 6 shows an embodiment in which the clothing treating apparatus according to the present disclosure measures a contamination level or a wrinkling level of clothes.

FIG. 6 shows one embodiment of the hot-air or steam supply in which the supply direction of the hot-air or steam may be controlled.

The hot-air or steam supply 700 has an air intake duct 710 that is connected to the clothing receiving space S and sucks air, a main duct 701 in which a heater 750 in communication with the air intake duct to heat the air to generate the hot-air is installed, an air discharge duct 720 connected to the main duct 701 to guide the hot-air to the clothing receiving space S. A blowing fan 740 may be disposed in one of the air intake duct 710, the main duct 701 or the air discharge duct 720 to generate air flow.

The air intake duct 710 may be constructed to communicate with the first air intake hole 121a and the second air intake hole 121b, and to receive air inside the clothing receiving portion 200. The air intake duct 710 may include a first air intake duct 711 communicating with the first air intake hole 121a, a second air intake duct 712 spaced from the first air intake duct and communicating with the second air intake hole 121b, and an air intake branch duct 713 which communicates the first air intake duct and the second air intake duct to the main duct 701.

The main duct 701 may be constructed to communicate with the air intake branch duct 713. Air may flow along the main duct 701. The heater 750 is installed in the main duct 701 so that the air collected from the clothing receiving portion 200 may be converted into hot-air.

The heater 750 may be disposed inside the main duct 701.

In one example, there is a need to dehumidify the air introduced into the main duct 701. Thus, the heater 750 may include an evaporator 751 to cool the air to condense moisture, a condenser 752 closer to the air discharge duct 720 than the evaporator 751 is to convert the air into a dry hot-air, and a compressor 753 to heat the refrigerant passing through the evaporator. Although not shown, the heater may further include an expansion valve disposed between the condenser and the evaporator to expand and cool the refrigerant.

As a result, air introduced from the first air intake hole 121*a* or the second air intake hole 121*b* may be dehumidified and heated in the main duct 701. The air discharge duct 720 may be constructed to communicate with a discharger disposed in the first inner body 211 and the second inner body 212, and may be constructed to deliver hot-air generated from the heater 750 to the clothing receiving portion 200.

The air discharge duct 720 may include a first air discharge duct 721 spaced apart from the first air intake duct 710, and communicating with the first air discharge hole 122*a*, a second air discharge duct 721 that is separated from the first air discharge duct and communicates with the second air discharge hole 122*b*, and an air discharge branch duct 723 that communicates the first air discharge duct and the second air discharge duct to the main duct.

The air discharge branch duct 723 may be constructed such that one end thereof communicates with the main duct 701, and the other end thereof communicates with the first air discharge duct 721 and the second air discharge duct 722. Accordingly, hot-air generated while passing through the main duct 701 may be dispersed and discharged to the first air discharge duct 721 and the second air discharge duct 722.

The hot-air or steam supply 700 may further include a steam supply 730 constructed to supply steam to the clothing receiving space S.

The steam supply 730 may be constructed to communicate with the main duct 701 or the air discharge duct 720 to deliver moisture into the main duct 701. This allows steam to be supplied to the clothing receiving space S together with the air heated in the main duct 701.

Further, as shown, the steam supply 730 may be separated from the main duct 701 so as to supply steam directly to the clothing receiving space S. This prevents the steam from remaining in the main duct 701 and contaminating the main duct 701.

The steam supply 730 includes a steam generator 735 constructed to generate steam, a steam guide duct 734 coupled to the steam generator to guide the steam, a first steam duct 731 branching from the steam guide duct to guide the steam to the first steam hole 123*a*, a second steam duct 732 branching from the steam guide duct to guide the steam to the second steam hole 123*b*, and a steam branch duct 733 that communicates the first steam duct and the second steam duct to the steam guide duct.

The steam generated from the steam supply 730 may pass through the steam guide duct 734 and may be distributed to the steam branch duct 733 and may be transferred to the first steam duct 731 and the second steam duct 732. The first steam duct 731 and the second steam duct 732 may communicate with the steam hole 250 to deliver the steam to the first clothing receiving space 221 and the second clothing receiving space 222, respectively.

The hot-air or steam supply 700 may include a flow-path switch 760 constructed to supply hot-air or steam only to a specific region of the clothing receiving space S, or supply hot-air or steam to the entire clothing receiving space S.

The clothing treating apparatus 100 according to one embodiment of the present disclosure controls the flow-path switch 760 to intensively supply steam or hot-air to the region having a high contamination or wrinkling level using a single hot-air or steam supply 700.

Figure 7:
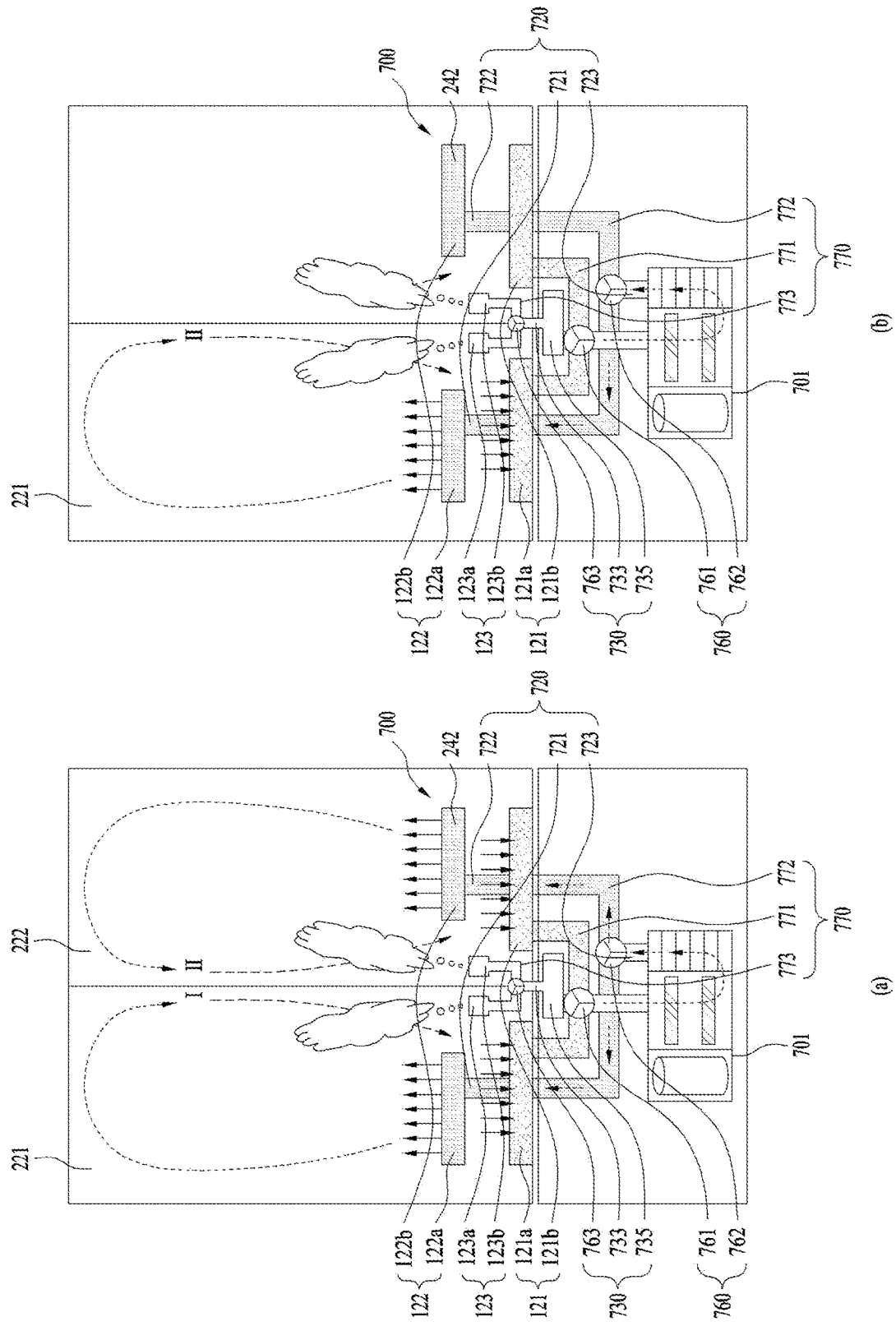
FIG. 7 shows a principle that the clothing treating apparatus according to the present disclosure predicts occurrence of wrinkling of clothes.

FIG. 7 shows one embodiment of the flow-path switch and a manner in which the target region is intensively treated.

Referring to (a) in FIG. 7, the flow-path switch 760 according to one embodiment of the present disclosure may be disposed in at least one of the air intake branch duct 713, the air discharge branch duct 723, and the steam branch duct 733.

The flow-path switch 760 may be disposed in each of the air intake branch duct 713 and the air discharge branch duct 723 and may be constructed to control the hot-air flowing to the first air intake duct 711 and the second air intake duct 712, and the hot air flowing to the first air discharge duct 721 and the second air discharge duct 722.

The flow-path switch 760 may be disposed in the air intake branch duct 713 to selectively close one of the first air intake duct 711 and the second air intake duct 712, or to open simultaneously the first air intake duct 711 and the second air intake duct 712.

Further, the flow-path switch 760 may be disposed in the air discharge branch duct 723 to selectively close one of the first air discharge duct 712 and the second air discharge duct 722, or to open simultaneously the first air discharge duct and the second air discharge duct.

For example, the flow-path switch 760 may be embodied as a three-way valve or a damper member installed on the air intake branch duct 713 or the air discharge branch duct 723.

The flow-path switch 760 may be constructed such that the first air intake duct 711 and the first air discharge duct 721 are always open at the same time or the second air intake duct 712 and the second air discharge duct 722 are always open at the same time.

Specifically, the flow-path switch 760 may include an air intake damper 761 disposed in the air intake branch duct to selectively close one of the first air intake duct and the second air intake duct, or to open the first air intake duct and the second air intake duct at the same time. The flow-path switch 760 may include an air discharge damper 762 disposed in the air discharge branch duct and constructed to selectively close one of the first air discharge duct and the second air discharge duct, or open the first air discharge duct and the second air discharge duct at the same time.

The flow-path switch 760 according to one embodiment of the present disclosure may include a steam damper 764 disposed in the steam branch duct 733 to selectively close one of the first steam duct and the second steam duct, or to open the first steam duct and the second steam duct at the same time. Thus, the controller of the clothing treating apparatus according to one embodiment of the present disclosure may control the fewer components to control the hot-air or steam to be supplied to a first clothing receiving space 221 and a second clothing receiving space 222.

The refreshing-related main controller 180 controls the flow-path switch 760 to supply hot-air or steam to the first region 221 of the clothing receiving space in the I direction or supply hot-air or steam to the second region 222 thereof in the II direction.

The refreshing-related main controller 180 may control the flow-path switch 760 to sequentially supply hot-air or steam in the I and II directions, and calculate a difference between the measured values detected by the sensor 161 in the I and II directions and identify a region having a high contamination level or a high wrinkling level among the clothing receiving space S based on the difference or identify a portion of the specific clothing received in the clothing receiving space S having a high contamination level or a high wrinkling level, based on the difference.

Referring to (b) in FIG. 7, the refreshing-related main controller 180 may intensively supply hot-air or steam to the region or the portion where the contamination level or the wrinkling level is high.

For example, when it is determined that the contamination level or the wrinkling level of the first region 221 is high, hot-air or steam may be intensively supplied only in the first direction.

Figure 8:
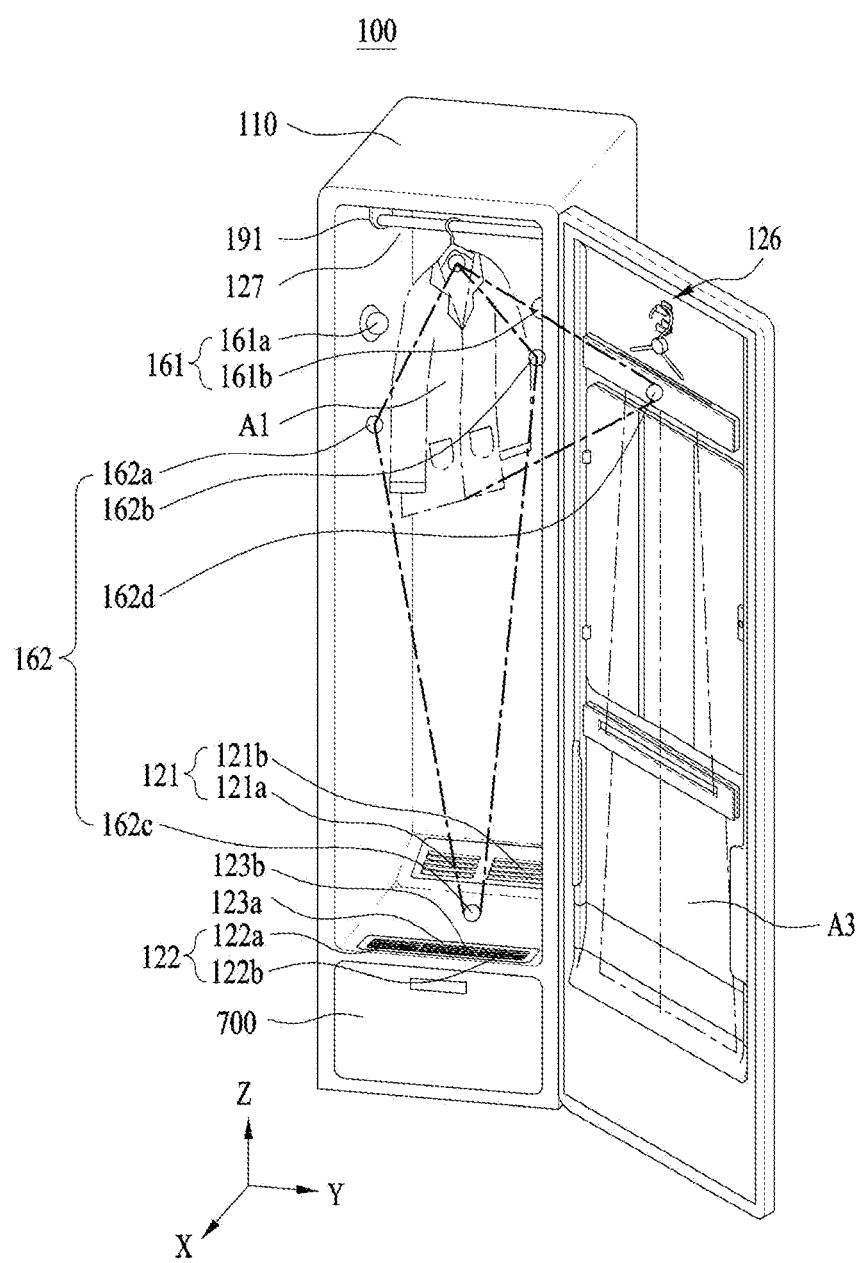
FIG. 8 shows a structure of an hot-air or steam supply of the clothing treating apparatus according to the present disclosure.

FIG. 8 shows an embodiment in which the above control method is applied to the internal camera 162 of the sensor 160.

In the state sensing operation T1, the inside camera 162 may be disposed on the inner face of the inner casing 120 and configured to image the clothing receiving space S. The inside camera 162 may be embodied as a depth camera configured to identify a 3D shape of the clothing received in the clothing receiving space S.

For example, the inside camera 162 may include a side camera 162a disposed on each of both inner side faces of the inner casing, a rear camera 162b disposed on a rear face of the inner casing, and a front camera 162d disposed on an inner face of the door 111, a bottom camera 162c disposed on an inner bottom face of the inner casing, and a top camera 162e disposed on a top face of the inner casing 120.

When the clothing is received in the space S, the inside camera 162 may image an exposed face of the clothing. The refreshing-related main controller 180 may analyze this image and perform the state checking operation T1 to detect the wrinkling level or the contamination level of the clothes. At the same time, the refreshing-related main controller 180 may perform the limit-value checking operation T2 to check whether the wrinkling level or the contamination level is above the limit value.

Furthermore, the refreshing-related main controller 180 may perform the concentrated-region determination operation T3 to determine a portion of the clothing having a high wrinkling level or a high contamination level.

Figure 9:
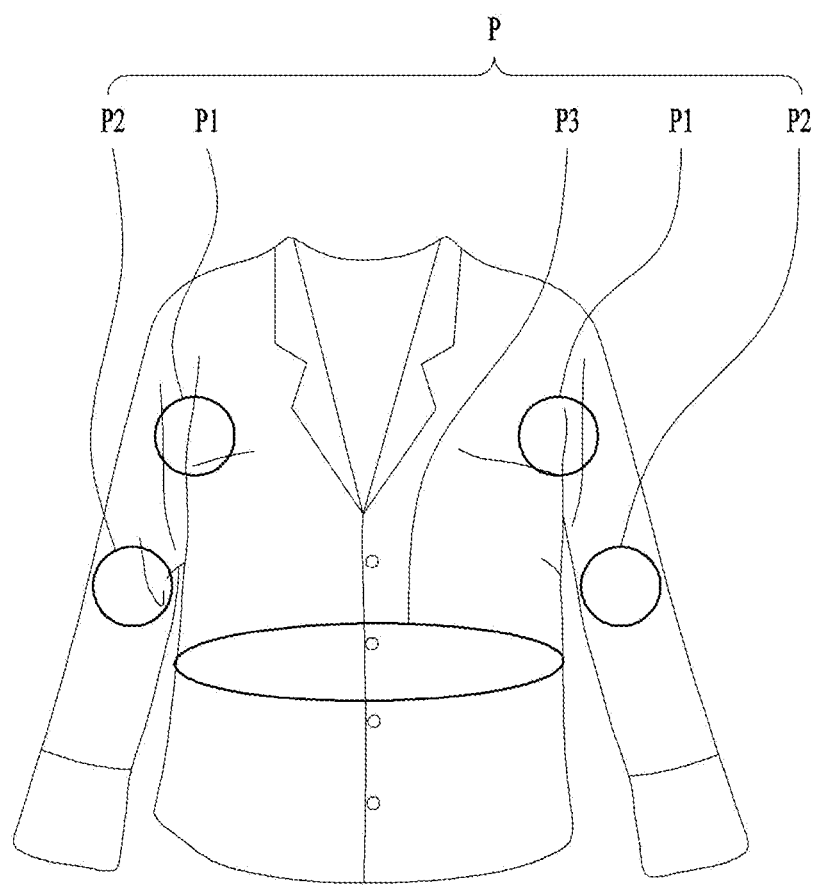
FIG. 9 shows one embodiment in which the clothing treating apparatus according to the present disclosure intensively supplies hot-air or steam to a specific portion.

FIG. 9 shows another embodiment in which the refreshing-related main controller 180 performs the concentrated-region determination operation T3.

The refreshing-related main controller 180 analyzes the image captured by the inside camera 162 and calculates a portion of the clothing having a wrinkling level when the clothing is worn by the user.

For example, the refreshing-related main controller 180 may be configured to determine that the clothing is the overcoat A1 using the inside camera 162.

That is, the refreshing-related main controller 180 may pre-predict a point P of the clothes having a high wrinkling level. The point P may include points P2 and P3 of the clothing corresponding to joints of the human body and a joint portion P1 between the upper body and the arm.

In the concentrated-region determination operation T3, the refreshing-related main controller 180 may determine the point P as the target region.

Further, in the intensive course selection operation T4, the refreshing-related main controller 180 may determine a course or option to intensively supply hot-air or steam to the point P.

Figure 10:
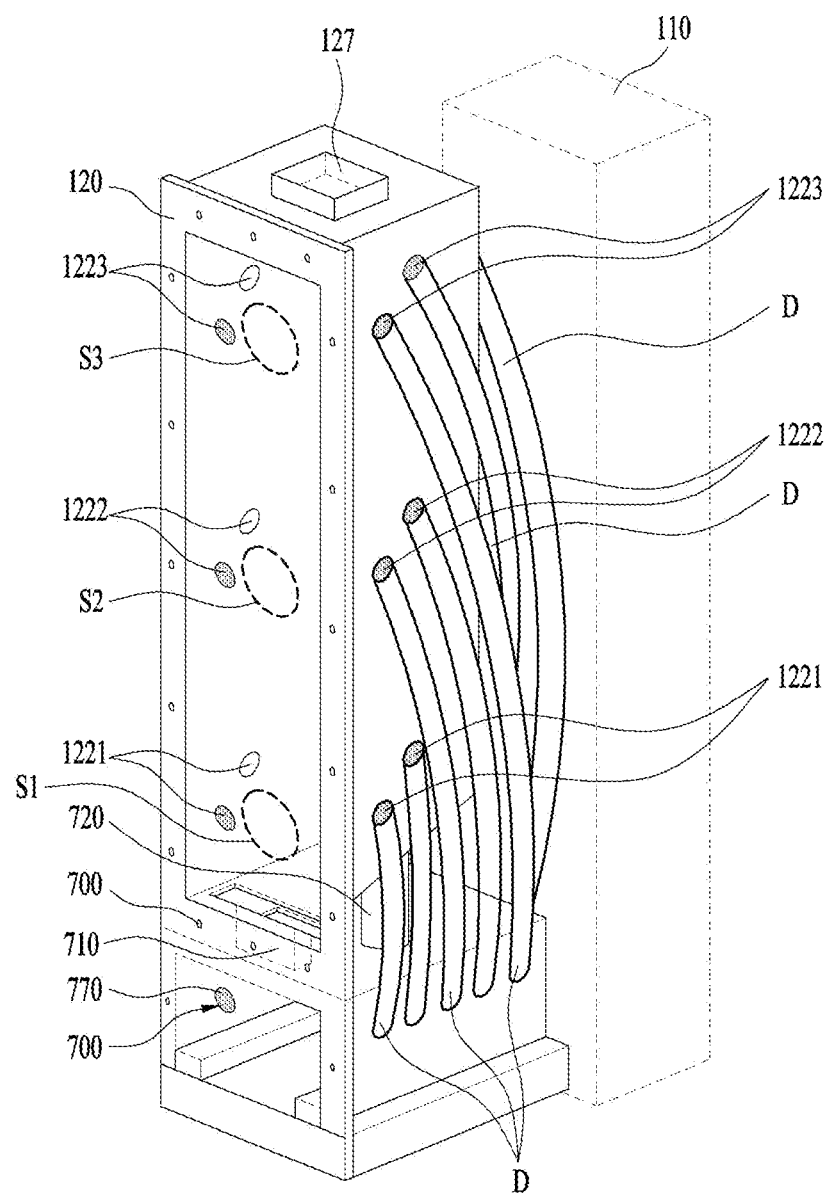
FIG. 10 shows another embodiment in which the clothing treating apparatus according to the present disclosure intensively supplies hot-air or steam to a specific portion.

FIG. 10 shows another embodiment in which the target region is intensively treated.

The hot air or steam supply according to one embodiment of the present disclosure may include a plurality of guide ducts D that communicates with the air discharge duct and the steam duct to guide steam or hot-air to the clothing receiving space S.

The plurality of guide ducts D may communicate with at least one of both side faces or a rear face of the inner casing. Further, the plurality of guide ducts D may be arranged and spaced apart from each other along at least one of a height or width direction of the inner casing.

The guide duct D may be in communication with the air discharge duct 720 or the steam supply 730.

Further, the inner casing 120 may include a plurality of concentrating holes 1221, 1222, and 1223 which may be arranged and spaced apart from each other and may be defined in the inner face of the inner casing and may communicate with the guide ducts D, respectively.

The concentrating holes may extend through the inner casing 120, and the plurality of concentrating holes may be arranged and spaced apart from each other in the height direction or the width direction. The plurality of concentrating holes may be arranged in the height direction or the width direction of the inner casing.

For example, the concentrating hole may be embodied as a through hole, and the guide duct D may be embodied as a pipe corresponding to the through hole.

In one example, the hot-air or steam supply 700 may include a bypass hole 770 communicating with the guide duct D and defined in an outer face thereof.

The concentrating holes may be defined in both side faces of the inner casing 120.

For example, the concentrating holes may include a first concentrating hole 1221 defined in a lower portion of the inner casing, a second concentrating hole 1222 defined above the first concentrating hole 1221, and a third concentrating hole 1223 defined above the second concentrating holes 1221.

The plurality of guide ducts D may be configured to be opened and closed individually by the flow-path switch. The flow-path switch may be embodied as a damper or a valve disposed in each of the plurality of guide ducts D. The flow-path switch may have any structure or a position as long as the guide ducts D may be individually controlled by the flow-path switch.

The first concentrating holes 1221 may be arranged in an opposite or staggered manner on both side faces of the inner casing 120. The second concentrating holes 1222 may be arranged in an opposite or staggered manner on both side faces of the inner casing 120. The third concentrating holes 1223 may be arranged in an opposite or staggered manner on both side faces of the inner casing 120.

When the target region is located in a lower region S1, the refreshing-related main controller 180 may supply hot-air or steam to the first concentrating holes 1221.

When the target region is located in a middle region S2, the refreshing-related main controller 180 may supply hot-air or steam to the second concentrating holes 1222.

When the target region is located in an upper region S3, the refreshing-related main controller 180 may supply hot-air or steam to the third concentrating holes 1223.

In another example, When a plurality of the target regions are present, the refreshing-related main controller 180 may control the flow-path switch to open the concentrating holes corresponding to the plurality of the target regions. As a result, the refreshing-related main controller 180 may open only a specific guide duct D when the contamination level or the wrinkling level is high at a specific portion of the inner casing 120 and intensively supply hot-air or steam to the specific portion.

Figure 11:
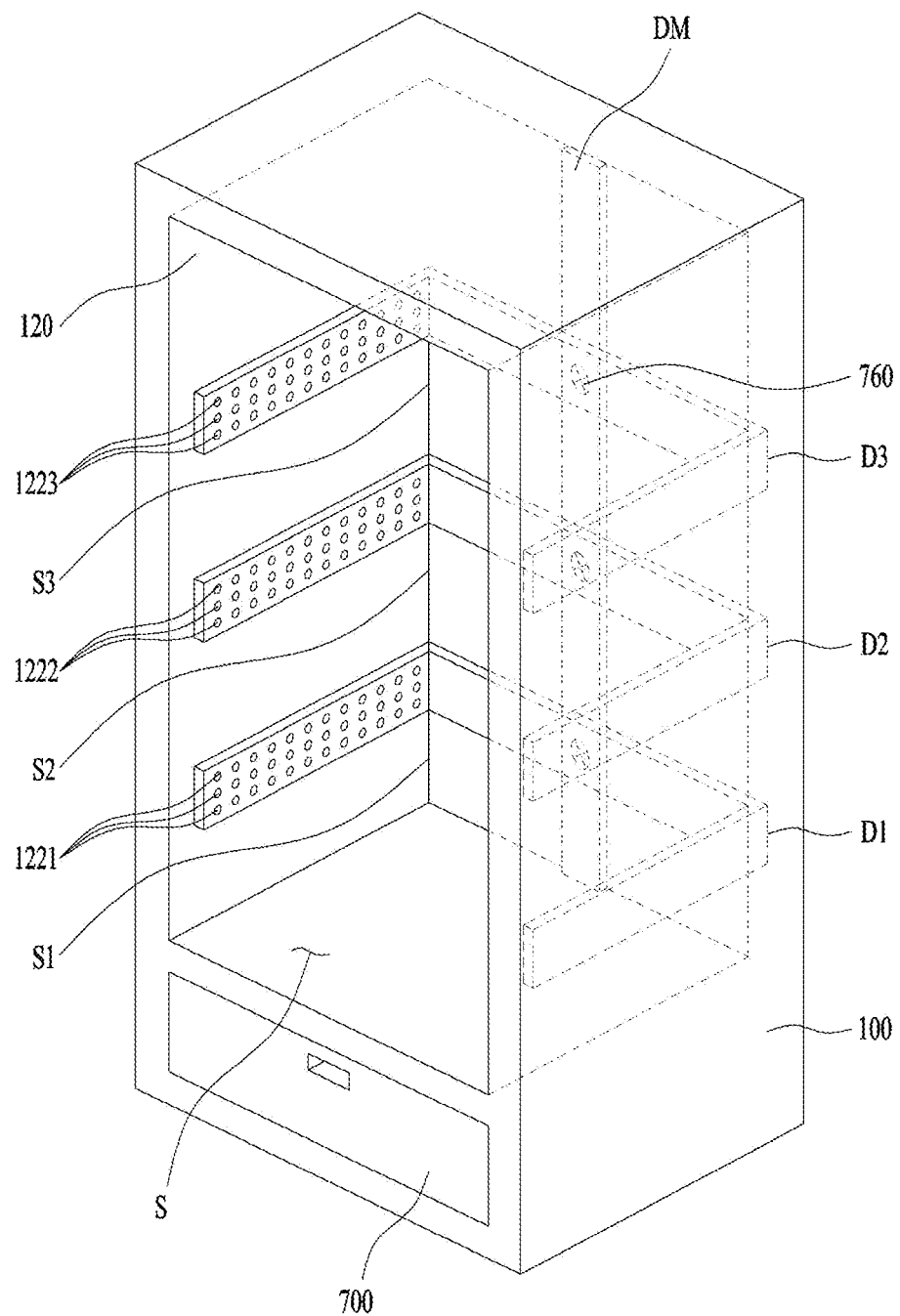
FIG. 11 shows another embodiment in which the clothing treating apparatus according to the present disclosure intensively supplies hot-air or steam to a specific portion.

FIG. 11 shows another embodiment in which the target region is intensively treated.

Further, the inner casing 120 may include a plurality of concentrating holes 1221, 1222, and 1223 spaced apart from each other and defined in the inner face thereof.

The plurality of concentrating holes 1221, 1222, and 1223 may extend through the inner casing 120, and may be arranged along the width direction of the inner casing 120.

The plurality of concentrating holes 1221, 1222, and 1223 may be arranged and spaced apart from each other by a predetermined distance in the height direction.

The plurality of concentrating holes may include first concentrating holes 1221 defined at a lower portion, second concentrating holes 1222 defined above the first concentrating holes 1221, and third concentrating holes 1223 defined above the second concentrating holes 1221.

The hot-air or steam supply 700 may include a basic duct DM which extends along the height of the inner casing and along which the hot-air or steam flows, and a plurality of branch ducts D1, D2, and D3 horizontally extending from the basic duct to the plurality of concentrating holes, respectively.

The basic duct DM may be disposed between the inner casing 120 and the cabinet 110, and may be located on a rear face of the inner casing 120.

The plurality of branch ducts D1, D2, and D3 may horizontally extend from the basic duct Dm along a rear face and along both side faces of the inner casing 120.

The plurality of concentrating holes may extend through a portion of each of the plurality of branch ducts D1, D2, and D3 facing an inner face of the inner casing 120.

When hot-air or steam is supplied from the basic duct Dm, the hot-air or steam may be divided into the plurality of branch ducts D1, D2, and D3 and may be supplied to the concentrating holes.

The plurality of branch ducts may include a first branch duct D1 in communication with the first concentrating holes 1221, a second branch duct D2 in communication with the second concentrating holes 1222, and a third branch duct D3 in communication with the third concentrating holes 1223.

A flow-path switch for controlling the opening and closing each of the plurality of branch ducts may be further located at each of the plurality of branch ducts. The refreshing-related main controller may be configured to control the flow-path switch to supply the hot-air or steam to the target region.

Thus, when the target region is located in the lower region S1, the refreshing-related main controller 180 may supply hot-air or steam to the first concentrating holes 1221.

When the target region is located in the middle region S2, the refreshing-related main controller 180 may supply hot-air or steam to the second concentrating holes 1222.

When the target region is located in the upper region S3, the refreshing-related main controller 180 may supply hot-air or steam to the third concentrating holes 1223.

In another example, when a plurality of the target regions are present, the refreshing-related main controller 180 may control each flow-path switch to open each branch duct corresponding to each of the target regions.

Further, when the contamination level or the wrinkling level is high in the specific portion of the inner casing 120, the refreshing-related main controller 180 may open only the specific branch duct corresponding to the specific portion to intensively supply hot-air or steam to the specific portion.

Figure 12:
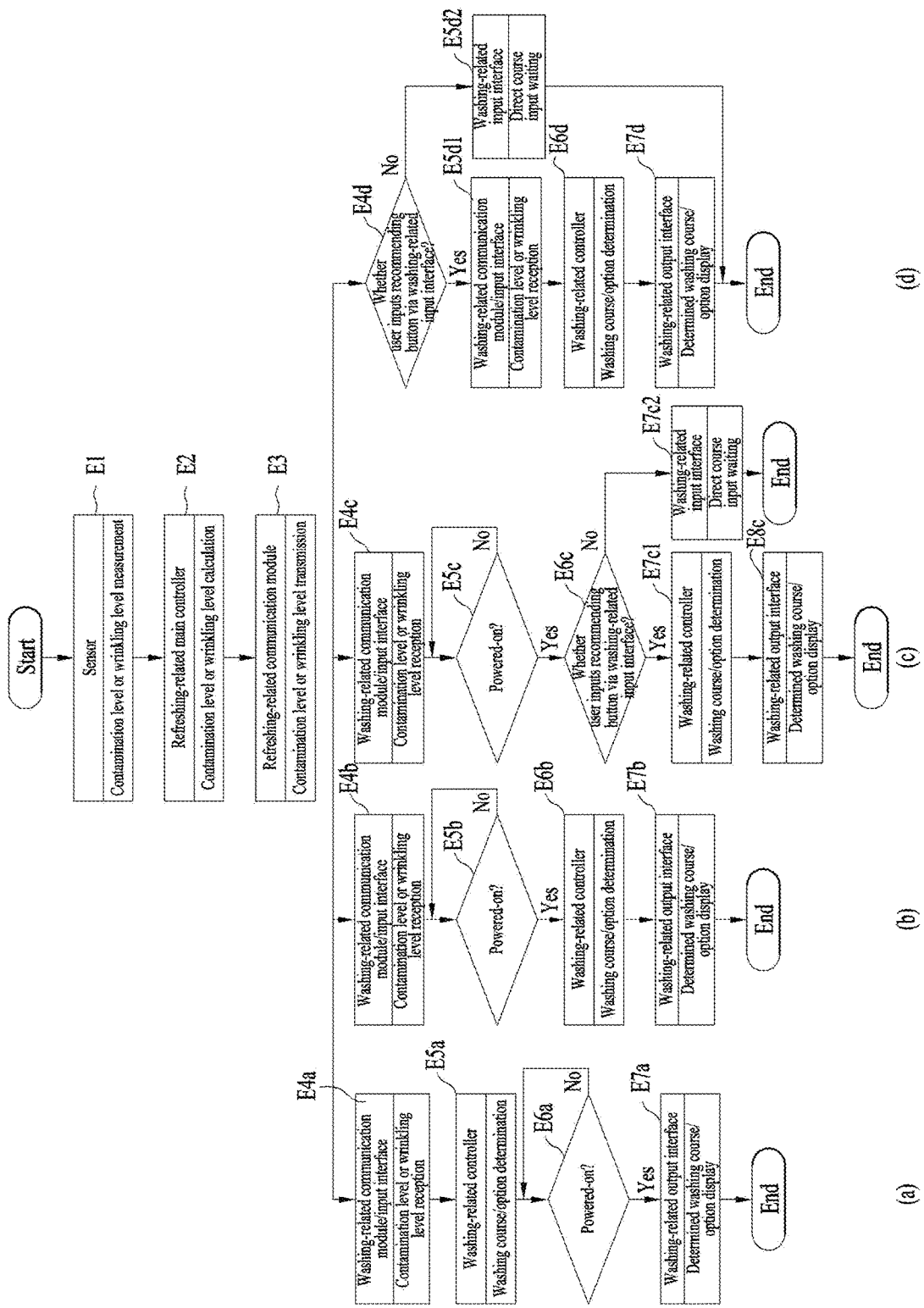
FIG. 12 shows a control method that the clothing treating apparatus according to the present disclosure and a washing machine may be connected with each other.

FIG. 12 shows an embodiment in which the clothing treating apparatus 100 directly sends wrinkling or contamination level information to the washing machine 300 so that a course or option may be determined based on the information by the washing machine 300.

A main feature of this embodiment is that the server 600 acts as means for establishing or maintaining the pairing between the clothing treating apparatus 100 and the washing machine 300, and the washing machine 300 directly determines a suitable washing course and washing option based on the wrinkling or contamination level received from the clothing treating apparatus 100.

Specifically, one embodiment of the on-line system according to one embodiment of the present disclosure may include the clothing treating apparatus 100 configured to execute an arbitrary refresh course or refresh option that performs refreshing of clothes, and the washing machine 300 configured to execute an arbitrary washing course or washing option performing a washing cycle to remove a foreign substance from the clothing.

The clothing treating apparatus 100 may provide the wrinkling level or the contamination level to the washing machine via the refreshing-related communication module 260. The washing machine 300 may be configured to receive information about the contamination level or the wrinkling level provided from the refreshing-related communication module via the washing-related communication module 360.

The washing-related communication module 360 may include the washing-related communication storage 362 that stores therein the contamination level or wrinkling level information provided from the refreshing-related communication module even in a state in which the operation of the washing machine stops.

The washing-related communication module 360 may include the washing-related communication controller 362. Upon receiving the contamination level or wrinkling level information from the refreshing-related communication module, the washing-related communication controller 362 may select the washing course or washing option corresponding to the contamination level or wrinkling level information provided from the refreshing-related communication module among the arbitrary washing courses or washing options, and provide the selected course or option to the washing-related output interface or the washing-related main controller.

When the washing course or washing option is determined, the washing-related main controller 370 may immediately display the determined washing course or washing option on the washing-related output interface 340.

The washing machine 300 further includes the washing-related input interface 350 instructing the washing-related output interface 340 to display the washing course or washing option corresponding to the contamination level or wrinkling level information provided from the refreshing-related communication module selected among the arbitrary washing courses or washing options on the washing-related output interface 340. The washing-related main controller 370 may transmit the determined washing course or washing option to the washing-related output interface when the user inputs a command to the washing-related input interface 350.

Further, the washing-related communication module 360 may be configured to receive the contamination level or wrinkling level information from the refreshing-related communication module when the user inputs a command to the washing-related input interface 350.

Specifically, one embodiment of the control method will be more specifically described with reference to FIG. 12.

A state in which the clothing treating apparatus 100 and the washing machine 300 are directly paired with each other may be maintained so that mutual recognition and mutual communication therebetween may be realized.

The sensor 160 of the clothing treating apparatus 100 may perform a measurement operation E1 of measuring the wrinkling level or the contamination level of the clothes received in the clothing receiving space S.

The refreshing-related main controller 170 of the clothing treating apparatus 100 may perform a calculation operation E2 of calculating the wrinkling level or the contamination level. In the calculation operation E2, when the wrinkling level or the contamination level is lower than the reference value, the refreshing-related main controller 170 determines a corresponding refresh course or option thereto. However, when the wrinkling level or the contamination level is higher than or equal to the reference value in the calculation operation E2, the refreshing-related main controller 170 may transmit the wrinkling level or the contamination level to the washing machine 300.

When the contamination level or the wrinkling level is greater than or equal to the reference value, the clothing treating apparatus 100 may perform a transmission operation E3 of transmitting the contamination level or the wrinkling level to the washing-related communication module 360 via the refreshing-related communication module 260.

When the washing machine 300 receives the contamination level or wrinkling level information, the washing-related communication controller 362 or the washing-related main controller 370 may determine the washing course and washing option corresponding to the contamination level or wrinkling level information.

The washing-related storage 380 may store therein an washing course and option corresponding to the contamination level or wrinkling level information in a form of a table. Therefore, the washing-related communication controller 362 or the washing-related main controller 370 may determine an washing course and an option based on the table.

Therefore, at least one of the washing-related communication controller 362, the washing-related main controller 370, or the server 600 may display the determined washing course or washing option on the washing-related output interface 340 of the washing machine 300 and may immediately recommend the display the determined washing course or washing option to the user.

Hereinafter, an embodiment in which the washing machine 300 receives information about the contamination level or the wrinkling level and recommends washing course or washing option based on the information to the user will be described based on (a) to (d) in FIG. 12.

Referring to (a) in FIG. 12, even when the washing machine 300 is in a stopped state, a state in which power is continuously supplied to the washing-related communication module 360 may be maintained.

Therefore, when information about the contamination level or the wrinkling level is transmitted from the clothing treating apparatus 100 to the washing machine 300, the washing machine 300 may perform a wrinkling/contamination level receiving operation E4a for receiving the information on the contamination level or the wrinkling level.

In this connection, the washing-related communication module 360 of the washing machine 300 may perform a determination operation E5a to determine the washing course and washing option corresponding to the wrinkling/contamination level using the washing-related communication controller 362. At the same time, the washing-related communication module 360 may store the wrinkling/contamination level in the communication storage 363 upon receiving the wrinkling/contamination level.

Thereafter, the washing machine 300 may perform a power-on sensing operation E6a to check whether the washing-related main controller 370 is powered on. When the user presses a power button of the washing machine 300 to supply power to the washing-related main controller, the washing-related communication controller 362 may perform an indication operation E1a in which the washing-related communication controller 362 delivers the determined washing course and washing option to the washing-related main controller 370 or directly to the washing-related output interface 340 which in turn may immediately display the determined washing course or washing option.

As a result, the control method in (a) in FIG. 8 is characterized by determining the washing course and washing option corresponding to the contamination level/wrinkling level as soon as the washing machine 300 receives the contamination level/wrinkling level. Thus, when the user powers on the washing machine and supplies power to the washing-related main controller 370, the washing machine 300 may rapidly display the washing course and washing option.

In other words, when the washing machine 300 receives information on the contamination level or the wrinkling level from the clothing treating apparatus 100, the washing machine 300 may immediately determine the washing course or washing option corresponding to the information. Then, when power is supplied to the washing machine 300, the washing machine may immediately recommend the determined washing course or washing option to the user.

Thereafter, the user may press only an execution button of the washing-related input interface 350 to perform the determined washing course and washing option. In another example, when the recommended washing course or washing option is not satisfactory, the user may enter the washing-related input interface 350 of the washing machine 300 to determine, on his/her own, any washing course or option.

(b) in FIG. 12 shows another embodiment. As for the control method in (b) in FIG. 8, even when the washing machine 300 is in a stopped state, the state in which power is continuously supplied to the washing-related communication module 360 or the washing-related input interface 350 may be maintained.

Therefore, when the information on the contamination level or the wrinkling level is transmitted, issued or displayed from or on the clothing treating apparatus 100, the washing machine 300 may perform a wrinkling/contamination level receiving operation E4b for receiving the contamination level or the wrinkling level.

In this connection, the washing-related communication module 360 of the washing machine 300 may first store the contamination level or the wrinkling level in the washing-related communication storage 363. Then, a power-on sensing operation E5b in which whether the washing-related main controller 370 is powered on is checked may be performed.

In other words, unlike the control method in (a) in FIG. 8, the washing-related communication module 360 does not directly determine the washing course and washing option corresponding to the contamination level or wrinkling level information, but simply store the contamination level or wrinkling level information in the washing-related communication storage 380. This may prevent excessive load from being concentrated on the washing-related communication controller 362 of the washing-related communication module 360.

When the user supplies power to the washing machine 300, the washing-related main controller 370 may perform a determination operation Ebb to determine a washing course or washing option corresponding to the contamination level or wrinkling level information. That is, when power is supplied to the washing-related main controller 370, the washing-related main controller 370 may receive the contamination level or wrinkling level information and determine a washing course and washing option corresponding thereto.

Thereafter, the washing-related main controller 380 may perform a presenting operation E7b in which the determined washing course or washing option is immediately displayed on the washing-related output interface 340.

Thus, when the washing machine 300 receives the contamination level or the wrinkling level from the clothing treating apparatus 100, and as soon as power is supplied thereto, the washing course or washing option corresponding to the level may be determined. Then, as soon as power is supplied to the washing machine 300, the washing course or washing option may be recommended to the user. As a result, the inconvenience that the user directly inputs a washing course or washing option may be eliminated.

(c) in FIG. 12 shows another embodiment.

Referring to (c) in FIG. 12, a state in which power is continuously supplied to the washing-related communication module 360 may be maintained even when the operation of the washing machine 300 stops.

Therefore, when information about the contamination level or the wrinkling level is transmitted from the clothing treating apparatus 100 to the washing machine 300, the washing machine 300 may perform a contamination level/wrinkling information receiving operation E4c for receiving the information on contamination level or the wrinkling level.

Upon receiving the contamination level/wrinkling information, the washing-related communication module 360 of the washing machine 300 may first store the contamination level/wrinkling information in the washing-related communication storage 363. Then, a power-on sensing operation E5c in which whether the washing-related main controller 370 is powered on is checked may be performed.

When power is supplied to the washing machine, the washing-related main controller 370 may perform an input sensing operation E6c in which whether the user inputs a recommending button for recommending the washing course and option to the user via the washing-related input interface 350 is checked. The recommendation button may be a separate button of the washing-related input interface 350 configured to recommend the washing course and option, or may be embodied as a combination of a plurality of buttons to activate the recommendation.

When the user directly touches the washing-related input interface 350 to input an intention to receive the recommendation of the washing course and washing option, the washing-related main controller 370 may perform a determination operation E7C1 to determine the washing course and washing option corresponding to the information on the contamination level or the wrinkling level, and may perform a presenting operation E8C in which the determined washing course and washing option is presented on the washing-related output interface 350.

In one example, when the input sensing operation has been executed, the washing machine may simultaneously perform an input waiting operation E7C2 in which whether the user directly inputs the washing course or washing option via the washing-related input interface 350 is checked.

Thus, even while the washing machine 300 and the clothing treating apparatus 100 is in a paired state, the intention for the user to receive the recommendation of the washing course and washing option that corresponds to the contamination level or wrinkling level information may be considered. Therefore, it may be excluded that the washing course or washing option is recommended on the output interface of the washing machine 300 regardless of the user's intention.

(d) in FIG. 12 shows another embodiment of a control method.

Referring to (d) in FIG. 12, even when the contamination level or wrinkling level information is transmitted from the clothing treating apparatus 100 to the washing machine 300, the washing machine may perform an input sensing operation E4d in which the input of the recommendation button is detected, and perform the washing information receiving operation E5c1, the determination operation E6c, and the presenting operation E7c only when the input of the recommendation button is detected in the input sensing operation.

In other words, when the input of the recommendation button is not detected in the input sensing operation, the washing machine 300 may not receive the contamination level or wrinkling level information, or may not determine the washing course and washing option corresponding thereto. Thus, the washing-related main controller or the washing-related communication module may not be forcefully activated when the user does not intend to receive the recommendation, thereby eliminating unnecessary load.

In this case, the power-on sensing operation may be omitted. This is because in order to detect whether the recommendation button is pressed, it is assumed that the washing machine 300 is in a state in which power is supplied thereto.

As a result, only when the user powers on the washing machine 300 and actively presses the recommendation button, the washing course and washing option may be automatically recommended to the user.

In one example, when the input sensing operation has been executed, the washing machine may simultaneously perform an input waiting operation E5d2 in which whether the user directly enters the washing course or washing option via the washing-related input interface 350 is checked.

Figure 13:
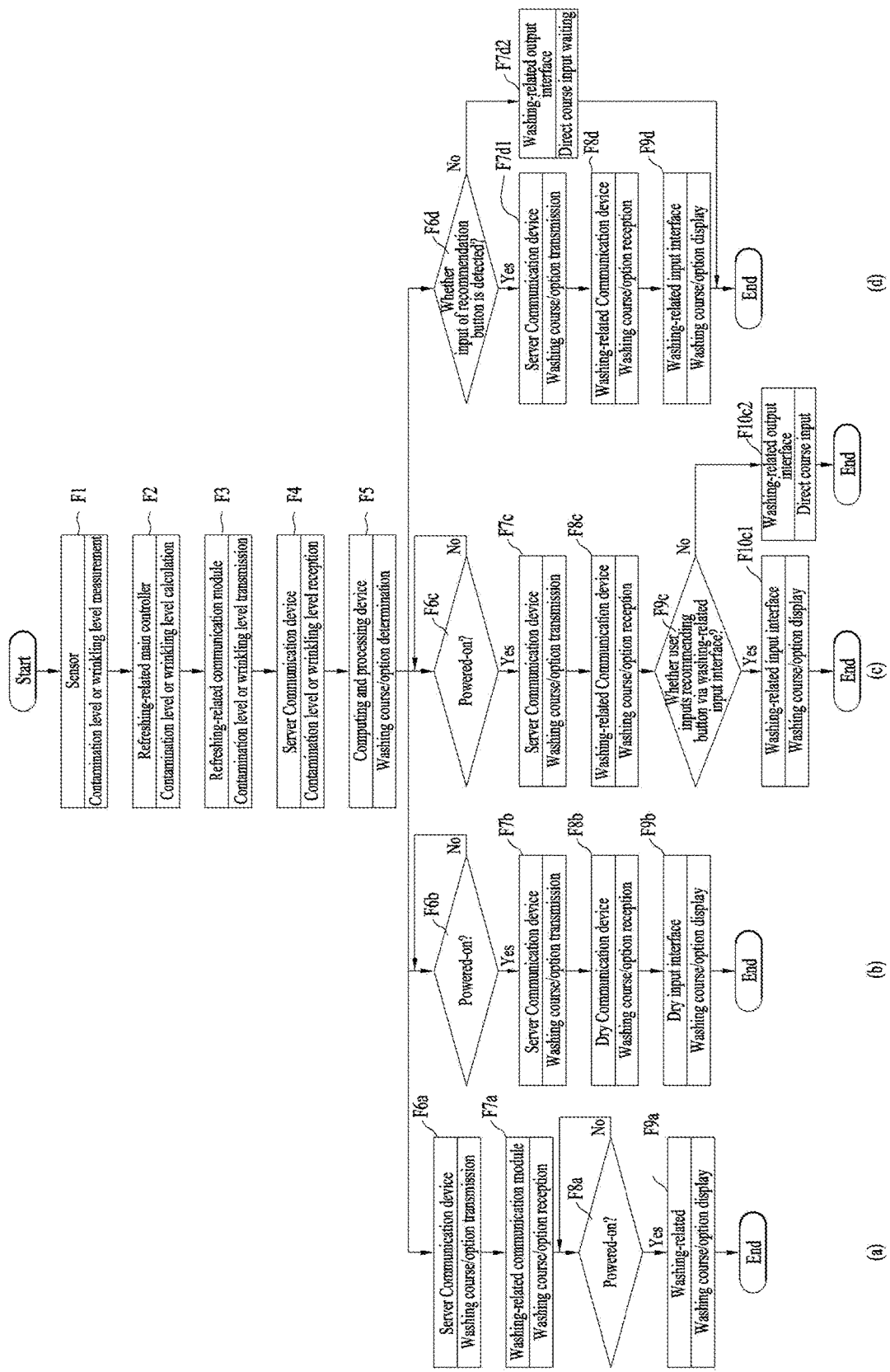
FIG. 13 shows a control method that the clothing treating apparatus according to the present disclosure may be connected to the washing machine and a server.

FIG. 13 shows an embodiment in which the clothing treating apparatus 100 may recommend a course or option to the washing machine 300 via the server 600.

The on-line system according to one embodiment of the present disclosure includes the clothing treating apparatus 100 including the refreshing-related communication module 260 that transmits the wrinkling or contamination level, the server 600 which receives the wrinkling level or the contamination level sent from the refreshing-related communication module and determines the washing course or washing option corresponding to the wrinkling level or the contamination level among arbitrary washing courses or washing options that performs a washing cycle to remove foreign substances from the clothing, and the washing machine 300 that may execute the washing course or washing option as determined by the server.

The washing machine 300 may include the washing-related communication module 360 configured to receive the washing course or washing option determined by the server, and the washing-related output interface 340 configured to output the received washing course or washing option.

The washing-related communication module 360 may be configured to communicate with the server 600 even when the operation of the washing machine stops. When the washing course or washing option is determined, the server 600 may be configured to transmit the washing course or washing option to the washing-related communication module.

Upon detecting that the power is supplied to the washing machine, the washing-related communication module 360 may be configured to request and receive the washing course or washing option or and from the server.

The washing machine 300 further includes the washing-related input interface 350 instructing to display the washing course or washing option determined by the server. When the user inputs a command to the washing-related input interface, the washing-related output interface 340 may be configured to display or output the washing course or washing option received via the washing-related communication module.

Further, when the user inputs a command to the washing-related input interface, the washing-related communication module 360 may be configured to request and receive the washing course and the washing option to and from the server 600.

In other words, the on-line system of FIG. 13 is characterized in that the server receives the information on the contamination level or the wrinkling level and directly determines the washing course and washing option corresponding thereto. Thus, it may suffice that the server may simply deliver the washing course and washing option to the washing machine 300, and the washing machine 300 may indicate or execute the washing course and washing option.

Therefore, there is no need for excessive load on the controller of the washing machine 300 or additional high-performance components such as a parallel computing device. Therefore, there is an advantage that a production cost of the washing machine may be reduced, or the control method of FIG. 9 may be applied to a conventional washing machine.

Specifically, an embodiment of the control method will be described in detail based on FIG. 13.

The clothing treating apparatus 100 and the washing machine 300 may be maintained in a state in which the clothing treating apparatus 100 and the washing machine 300 are paired with each other via the server 600, so that mutual recognition and mutual communication therebetween may be realized.

The sensor 160 of the clothing treating apparatus 100 may perform a measurement operation F1 of measuring the wrinkling level or the contamination level of the clothes accommodated in the clothing receiving space S. The refreshing-related main controller 170 of the clothing treating apparatus 100 may perform a calculating operation F2 of calculating the wrinkling or contamination level. When the wrinkling level or the contamination level is lower than the reference value in the calculation operation F2, the refreshing-related main controller 170 determines the refresh course or option corresponding to the wrinkling level or the contamination level. However, when the wrinkling level or the contamination level is higher than or equal to the reference value in the calculation step F2, the refreshing-related main controller 170 of the clothing treating apparatus 100 may transmit the wrinkling level or the contamination level to the server 600.

The refreshing-related communication module 360 of the clothing treating apparatus 100 performs a transmission operation F3 in which the contamination level or wrinkling level information is transmitted to the server 600. The server 600 performs a contamination level/wrinkling information receiving operation F4 to receive the contamination level or wrinkling level information via the communication device 610, and then perform a determination operation F5 in which the computing and processing device 620 processes the contamination level/wrinkling information and determine the washing course and washing option corresponding to the wrinkling or contamination level.

The storage device 630 of the server may store therein an arbitrary washing course and option corresponding to the contamination level or wrinkling level information in a form of a table. Further, the server 600 may determine the washing course or washing option corresponding to the contamination level or wrinkling level information.

Therefore, the server 600 may display the determined washing course or washing option on the washing-related output interface 340 of the washing machine 300 such that the determined washing course or washing option is recommended to the user.

Specifically, the control method in which the washing course and washing option determined by the server 600 is displayed on the washing-related output interface 340 of the washing machine will be described based on (a) to (d) in FIG. 13.

Referring to (a) in FIG. 13, the communication device 610 of the server performs a washing course/option transmission operation F6a in which the washing course and washing option determined by the computing and processing device are transmitted to the washing machine 300 paired with the clothing treating apparatus 100.

The washing-related communication module 360 of the washing machine 300 performs a washing course/option receiving operation F1a in which the washing-related communication module 360 receives a washing course and a washing option even when the power is not supplied to the washing-related main controller 370 of the washing machine.

The washing-related communication module 360 may perform a power-on sensing operation F8a in which whether power is supplied to the washing-related main controller 370 is checked, and when power is not supplied to the washing-related main controller 370, the washing-related communication module 360 waits until the power is supplied thereto.

When power is supplied to the washing-related main controller 370, the washing-related main controller 370 performs a presenting operation F9a in which the washing-related main controller 370 receives the washing course and washing option from the washing-related communication module 360 and displays the washing course and washing option on the washing-related output interface 350.

Thus, the wrinkling level or the contamination level calculated by the clothing treating apparatus 100 may be transferred to the server 600 which may determine the washing course and washing option corresponding thereto. When power is supplied to operate the washing machine 300, the washing course and washing option may be displayed on the washing-related output interface 340 and may be recommended to the user.

(b) in FIG. 13 shows a different control method from that of (a) FIG. 13.

Referring to (b) in FIG. 13, the washing-related communication module 360 performs a power-on sensing operation F6*b* in which whether the washing machine 300 is powered on is detected.

When the washing machine 300 is powered on in the power-on sensing operation F6*b*, the washing-related communication module 360 may transmit state information including information indicating that power has been supplied to the washing machine 300 to the server 600. When the server 600 receives the state information indicating that the washing machine has been powered on, the server 600 performs an transmission operation F7*b* in which the washing course or washing option determined by the computing and processing device is transmitted to the washing-related communication module 360 of the washing machine 300.

The washing-related communication module 360 performs a receiving operation F8*b* for receiving the washing course or washing option from the server. In the receiving operation, the washing-related communication module 360 stores therein the washing course or washing option in the washing-related communication storage 380, or transfers the same to the washing-related main controller 370.

The washing machine 300 performs a presenting operation F9*b* for displaying or presenting the washing course and washing options stored in the washing-related communication storage 380 or transferred to the washing-related main controller 370.

Accordingly, the washing-related communication module 360 and the server 600 may transmit and receive the washing course and the washing option using a general process in which the washing-related communication module 360 and the server 600 transmit and receive data, thereby maximizing communication efficiency.

(c) in FIG. 13 shows another control method.

Referring to (c) in FIG. 13, the washing-related communication module 360 performs a power-on sensing operation F6*c* for detecting whether the washing machine 300 is powered on.

When the washing machine 300 is powered on in the power-on sensing operation Fhb, the washing-related communication module 360 may transmit state information including information indicating that power has been supplied to the washing machine 300 to the server 600.

When the server 600 receives the state information, the server performs a transmission operation F7*c* in which the washing course or washing option determined by the computing and processing device is transmitted to the washing-related communication module 360.

The washing-related communication module 360 performs a receiving operation F8*c* for receiving the washing course or washing option from the server.

When the washing-related communication module 360 receives the washing course or washing option, the washing machine 300 may perform an input sensing operation F9*c* for detecting whether there is an input of the recommending button for recommending the washing course and washing option via the washing-related input interface 350.

When the user directly touches the washing-related input interface 350 and inputs the intention to receive the recommendation of the washing course and washing option, the washing-related main controller 370 may perform a presenting operation F10C1 for displaying or presenting the received washing course and washing option on the washing-related output interface 340.

In one example, when the input sensing operation has been executed, the washing machine 300 may perform an input waiting operation F10C2 in which whether the user directly input the washing course or washing option via the washing-related input interface 350 is checked. In the input waiting operation, the user does not input the intention to receive the recommendation of the washing course and washing option from the server 600, but directly input the washing course and washing option, the washing-related main controller 370 may operate the washing machine 300 using the directly input washing course or washing option, while ignoring the recommended washing course and washing option.

Thus, even in a state in which the washing machine 300 and the clothing treating apparatus 100 are paired with each other, the intention of the user to receive the recommendation of the washing course and washing option corresponding to the clothing treating apparatus 100 may be considered. This may prevent the washing course or washing option from being recommended on the display of the washing machine 300 regardless of the user's intention.

(d) in FIG. 13 shows another control method.

Referring to (d) in FIG. 13, even when the washing course and washing option are determined by the server or power is supplied to the washing machine 300, the washing machine 300 performs an input sensing operation F5*d* in which the input of the recommendation button is detected.

When the input of the recommendation button is detected in the input sensing operation, the washing-related communication module 360 may perform a request transmission operation F7*d*1 for requesting the server 600 to transmit the washing course and washing option.

The washing-related communication module 360 performs a receiving operation F8*d* for receiving the washing course and washing option from the server. The washing-related main controller 370 may perform a presenting operation F9*d* for displaying or presenting the received washing course and washing option on the washing-related output interface 340.

In one example, when the input sensing operation has been executed, the washing machine 300 may perform an input waiting operation F7*d*2 in which whether the user directly inputs the washing course or washing option via the washing-related input interface 350 is detected. When the user directly input the washing course and washing option while not inputting the intention to receive the recommendation of the washing course and washing option from the server 600 in the input waiting operation, the washing machine 300 may omit the process of receiving the washing option or the washing course from the server 600.

Thus, even in the state in which the washing machine 300 and the clothing treating apparatus 100 are paired with each other, not only the intention of the user to receive the recommendation of the washing course and washing option corresponding to the wrinkling level or the contamination level of the clothes may be considered, but also unnecessary communication between the server 600 and the washing machine 300 may be omitted.

The present disclosure may be modified and implemented in various forms, and the scope of the rights thereof is not limited to the above-described embodiments. Therefore, when modified embodiments include elements of claims, the modified embodiments should be considered to belong to the scope of the present disclosure.

What is claimed is:

1. A clothing treating apparatus comprising:
   a cabinet having a front opening defined therein;
   an inner casing disposed in the cabinet, wherein a space to accommodate clothing therein is defined in the inner casing;

a hot-air or steam supply disposed in the cabinet to supply hot-air or steam to the space;

a door coupled to the cabinet or the inner casing to open and close the opening;

a sensor disposed on at least one of the inner casing or the door to detect a state of the space or the clothing; and a controller configured to control at least one of the sensor or the supply to detect a contamination level or a wrinkling level of the clothing.

2. The clothing treating apparatus of claim 1, wherein the sensor includes an inside camera disposed on at least one of the inner casing or the door to image the space or the clothing, wherein the controller is configured to detect the contamination level or the wrinkling level of the clothing based on the image taken by the inside camera.

3. The clothing treating apparatus of claim 1, wherein the sensor includes a gas sensor disposed on at least one of the inner casing or the door to detect a gas fluid state in the space, wherein the controller is configured to detect the contamination level of the clothing based on a measurement value detected by the gas sensor.

4. The clothing treating apparatus of claim 3, wherein the controller is configured to control both the gas sensor and the supply to detect the contamination level of the clothing.

5. The clothing treating apparatus of claim 4, wherein the controller is configured to:

compare a measurement value from the gas sensor before activating the supply with a measurement value from the gas sensor after activating the supply; and detect the contamination level of the clothing based on the comparison result.

6. The clothing treating apparatus of claim 1, wherein the apparatus further comprises a storage for storing therein arbitrary courses or options to control the supply to refresh the clothing;

wherein the controller is configured to select a course or option corresponding to the contamination level or the wrinkling level from the arbitrary courses or options.

7. The clothing treating apparatus of claim 6, wherein the apparatus further comprises a display disposed on one of the cabinet or the door to display a signal from the controller, wherein the controller is configured to display the selected course or option on the display.

8. The clothing treating apparatus of claim 1, wherein the apparatus further comprises a display disposed on one of the cabinet or the door to display a signal from the controller, wherein when one of the contamination level and the wrinkling level is higher than or equal to a limit value, the controller is configured to display, on the display, an indication to wash the clothing.

9. The clothing treating apparatus of claim 8, wherein the apparatus further comprises a communication module for transmitting the signal from the controller to an external component, wherein the controller is configured to control the communication module to transmit the contamination level or the wrinkling level to a washing machine for washing the clothing or a server.

10. A clothing treating apparatus comprising:

a cabinet having a front opening defined therein;

an inner casing disposed in the cabinet, wherein a space to accommodate clothing therein is defined in the inner casing;

a hot-air or steam supply disposed in the cabinet to supply hot-air or steam to the space;

a door coupled to the cabinet or the inner casing to open and close the opening;

a sensor disposed on at least one of the inner casing or the door to detect a state of the space or the clothing; and a controller configured to control at least one of the sensor or the supply to detect a target region in which a contamination level or a wrinkling level of the clothing is higher than or equal to a reference value.

11. The clothing treating apparatus of claim 10, wherein the sensor includes an inside camera disposed on at least one of the inner casing or the door to image the space or the clothing, wherein the controller is configured to:

detect the target region based on the image; or calculate a portion of the clothing in which the wrinkling level is expected to be high.

12. The clothing treating apparatus of claim 10, wherein the sensor includes a gas sensor comprising:

a first gas sensor disposed on one face of the inner casing, a second gas sensor disposed on another face of the inner casing adjacent or opposite to one face, wherein the controller is configured to:

compare a measurement value from the first gas sensor with a measurement value from the second gas sensor; and detect the target region in which the contamination level of the clothing is higher than the reference value, based on the comparison result.

13. The clothing treating apparatus of claim 10, wherein the controller is configured to control the supply to supply hot-air or steam to the target region.

14. The clothing treating apparatus of claim 13, wherein the supply includes:

an air intake duct communicating with the inner casing and sucking air;

a main duct communicating with the air intake duct, wherein a heater for generating the hot-air or steam according to a signal from the controller is disposed in the main duct;

an air discharge duct communicating with the main duct and guiding the hot-air or steam to the inner casing; and a flow-path switch configured to control an opening or closing amount of the air discharge duct based on a signal from the controller.

15. The clothing treating apparatus of claim 14, wherein the air discharge duct includes:

a first air discharge duct for guiding the hot-air or steam to one face of the inner casing; and a second air discharge duct for guiding the hot-air or steam to another face of the inner casing adjacent or opposite to one face, wherein the flow-path switch is configured to open only one of the first air discharge duct and the second air discharge duct, or both the first air discharge duct and the second air discharge duct, based on a signal from the controller.

16. The clothing treating apparatus of claim 14, wherein the inner casing has a plurality of concentrating holes defined therein, wherein the plurality of concentrating holes are arranged and spaced from each other by a predetermined spacing along a vertical direction, wherein the hot-air or the steam is supplied into the concentrating holes, wherein the supply includes:

a basic duct extending along a vertical direction of the inner casing, wherein the hot-air or steam flows along the basic duct;

a plurality of branch ducts extending from the basic duct to the plurality of concentrating holes respectively, wherein the branch ducts transfer the hot-air or steam; and a flow-path switch for controlling opening and closing of the plurality of branch ducts, wherein the controller is configured to control the flow-path switch to supply the hot-air or steam to the target region.

17. An on-line system comprising:

a clothing treating apparatus for performing a treatment cycle for refreshing clothing, wherein the clothing treating apparatus includes a refreshing-related communication module capable of transmitting clothing information, a wrinkling level or a contamination level of the clothing;

a server for receiving the clothing information, the wrinkling level or the contamination level from the refreshing-related communication module, and determining a washing course or washing option corresponding to the clothing information, the wrinkling level or the contamination level among arbitrary washing courses or washing options for performing a washing cycle for removing foreign substances from the clothing; and a washing machine for executing the washing course or washing option determined by the server, wherein the washing machine includes:
   a washing-related communication module for receiving the washing course or washing option determined by the server; and
   a washing-related output interface configured to output the received washing course or washing option.

18. The on-line system of claim 17, wherein the washing-related communication module is configured to communicate with the server even when an operation of the washing machine stops, wherein when the washing course or the washing option corresponding to the clothing information, the wrinkling level or the contamination level is determined, the server is configured to transmit the washing course and the washing option to the washing-related communication module.

19. The on-line system of claim 18, wherein the washing machine further include a washing-related input interface for instructing the washing-related output interface to output the washing course or washing option determined by the server, wherein when an input is inputted to the washing-related input interface, the washing-related output interface is configured to output the washing course or washing option received by the washing-related communication module.

20. The on-line system of claim 17, wherein upon detecting that power is supplied to the washing machine, the washing-related communication module is configured to request and receive the washing course or the washing option to and from the server.

21. The on-line system of claim 17, wherein the washing machine further includes a washing-related input interface for instructing the washing-related output interface to output the washing course or washing option determined by the server, wherein when an input is inputted to the washing-related input interface, the washing-related communication module is configured to request and receive the washing course and the washing option to and from the server.

22. An on-line system comprising:

a clothing treating apparatus for performing a treatment cycle to refresh clothing and for detecting clothing information, a wrinkling level or a contamination level of the clothing; and a washing machine configured to execute arbitrary washing courses or washing options to perform a washing cycle to remove foreign substances from the clothing, wherein the clothing treating apparatus includes a refreshing-related communication module for transmitting the clothing information, the wrinkling level or the contamination level to the washing machine, wherein the washing machine includes:
   a washing-related communication module configured to receive the clothing information, the wrinkling level or the contamination level from the refreshing-related communication module;
   a washing-related controller for determining a washing course or washing option corresponding to the clothing information, the wrinkling level or the contamination level provided from the refreshing-related communication module among the arbitrary washing courses or washing options; and
   a washing-related output interface configured to output the washing course or washing option determined by the washing-related controller.

23. The on-line system of claim 22, wherein the washing-related communication module further includes a communication controller, wherein upon receiving the clothing information, the wrinkling level or the contamination level from the refreshing-related communication module, the communication controller is configured to determine the washing course or washing option corresponding to the clothing information, the wrinkling level or the contamination level provided from the refreshing-related communication module among the arbitrary washing course or washing options, and to provide the determined washing course or washing option to the washing-related output interface or the washing-related controller.

* * * * *